(12) United States Patent
Shan et al.

(10) Patent No.: US 11,455,323 B2
(45) Date of Patent: Sep. 27, 2022

(54) DATA PROCESSING METHOD AND SYSTEM

(71) Applicant: HUAWEI CLOUD COMPUTING TECHNOLOGIES CO., LTD., Gui'an New District (CN)

(72) Inventors: Weihua Shan, Xi'an (CN); Hui Yin, Xi'an (CN)

(73) Assignee: HUAWEI CLOUD COMPUTING TECHNOLOGIES CO., LTD., Gui'an New District (CN)

( * ) Notice: Subject to any disclaimer, the term of this patent is extended or adjusted under 35 U.S.C. 154(b) by 17 days.

(21) Appl. No.: 17/149,877

(22) Filed: Jan. 15, 2021

(65) Prior Publication Data

US 2021/0133215 A1    May 6, 2021

Related U.S. Application Data

(63) Continuation of application No. PCT/CN2019/087995, filed on May 22, 2019.

(30) Foreign Application Priority Data

Jul. 19, 2018 (CN) .......................... 201810793637.9
Nov. 12, 2018 (CN) .......................... 201811337593.5

(51) Int. Cl.
*G06F 16/28* (2019.01)
*G06F 16/245* (2019.01)

(52) U.S. Cl.
CPC .......... *G06F 16/285* (2019.01); *G06F 16/245* (2019.01)

(58) Field of Classification Search
CPC .............................. G06F 16/285; G06F 16/245
See application file for complete search history.

(56) References Cited

U.S. PATENT DOCUMENTS

| 10,466,217 | B1* | 11/2019 | Sayfan | G01N 33/0075 |
|---|---|---|---|---|
| 10,558,647 | B1* | 2/2020 | Krueger | G06F 16/2477 |
| 2008/0270363 | A1 | 10/2008 | Hunt et al. | |
| 2011/0153603 | A1 | 6/2011 | Adiba et al. | |
| 2013/0290300 | A1 | 10/2013 | Chen et al. | |
| 2014/0189689 | A1* | 7/2014 | Masuno | G06F 9/5088 718/1 |
| 2016/0370338 | A1* | 12/2016 | Sayfan | G01N 33/0062 |

(Continued)

FOREIGN PATENT DOCUMENTS

| CN | 103324724 A | 9/2013 |
|---|---|---|
| CN | 103997753 A | 8/2014 |

(Continued)

OTHER PUBLICATIONS

European Patent Office Search Report dated Sep. 17, 2021 for Application No. 19838302.8, 8 pages.

(Continued)

*Primary Examiner* — Alicia M Willoughby

(57) ABSTRACT

Embodiments of this application provide a data processing method in a database. A plurality of aggregation intervals are selected, wherein the plurality of aggregation intervals are different from each other. And at least one piece of data in the database is aggregated separately based on each aggregation interval, so that data clusters stored in the database have data ranges with different attribute value spans.

17 Claims, 9 Drawing Sheets

(56) References Cited

U.S. PATENT DOCUMENTS

| | | | |
|---|---|---|---|
| 2017/0032015 A1* | 2/2017 | Shkapenyuk | G06F 16/283 |
| 2018/0285780 A1* | 10/2018 | Ouyang | G06F 16/285 |
| 2019/0087453 A1* | 3/2019 | Matsuzaki | G06F 16/285 |

FOREIGN PATENT DOCUMENTS

| | | | |
|---|---|---|---|
| CN | 104750708 A | 7/2015 | |
| CN | 104951509 A | 9/2015 | |
| CN | 105468651 A | 4/2016 | |
| CN | 106651200 A | 5/2017 | |
| CN | 107077453 A | 8/2017 | |
| CN | 107391502 A | 11/2017 | |
| CN | 107402863 A | 11/2017 | |
| CN | 107562892 A | 1/2018 | |
| CN | 107864071 A | 3/2018 | |

OTHER PUBLICATIONS

International Search Report and Written Opinion dated Feb. 6, 2020, issued in CN Application No. PCT/CN2019/116954, total 12 pages.
International Search Report and Written Opinion dated Aug. 21, 2019, issued in CN Application No. PCT/CN2019/087995, total 8 pages.

* cited by examiner

DATA PROCESSING METHOD AND SYSTEM

CROSS-REFERENCE TO RELATED APPLICATIONS

This application is a continuation of International Application No. PCT/CN2019/087995, filed on May 22, 2019, which claims priority to Chinese Patent Application No. 201811337593.5, filed on Nov. 12, 2018, and Chinese Patent Application No. 201810793637.9, filed on Jul. 19, 2018. All of the aforementioned patent applications are hereby incorporated by reference in their entireties.

TECHNICAL FIELD

This application relates to the field of information technologies, and in particular, to a data processing method and a system.

BACKGROUND

In the fields of finance, e-commerce, public security, and the like, there are scenarios such as fraud surveillance, accurate marketing recommendation, and crime and disaster forecast. In these scenarios, a user requires real-time analysis and processing on data that enters a database. For example, in real-time risk control of financial transactions, when each transaction is made, a risk control computing platform needs to calculate an aggregate value of all transactions within a 56-day time window in real time while meeting a delay requirement of a millisecond level, including a total transaction volume, a sum of squares of the transactions, a total quantity of the transactions, and the like. The aggregate value is used for further complex analysis such as rule inference and model scoring. When data is generated, value of the data decreases with time. Therefore, the data needs to be processed immediately when the data appears, instead of being cached for batch processing, and real-timeness of data processing by the database is particularly important.

In addition, the data in the foregoing scenarios features a relatively large scale and continuous arrival, and the features of the data pose a challenge to real-timeness of data processing. To process a large scale of continuous data in real time, and provide a user with an aggregate value of data in a database in real time, the data in the database needs to be aggregated before the database receives a query request. How to aggregate the data in the database to ensure real-timeness of a query request for the aggregate value and accuracy of a query range is a problem to be resolved urgently in a database system.

SUMMARY

According to a first aspect, an embodiment of this application provides a data processing method in a database. The method includes: obtaining at least one piece of data, where each piece of data includes at least one attribute; separately performing aggregation calculation, based on M aggregation intervals, on an attribute value of a first target attribute of the at least one piece of data to obtain T data clusters, where the M aggregation intervals are different from each other, each data cluster includes an aggregate value, the aggregate value of each data cluster is obtained by performing aggregation calculation on the attribute value of the first target attribute based on an aggregation interval corresponding to the data cluster, M is an integer greater than or equal to 2, and $T \geq M$; and storing the T data clusters.

The plurality of aggregation intervals are selected, and the at least one piece of data in the database is aggregated based on the plurality of aggregation intervals, so that the data clusters stored in the database have data ranges with different attribute value spans. Therefore, when an aggregate value is queried based on a data cluster stored in the database, real-timeness of aggregate value query is improved while accuracy of a query range is ensured.

With reference to the first aspect, in a first possible implementation of the first aspect, the method further includes: presetting M aggregation layers, where each aggregation layer corresponds to one aggregation interval, the T data clusters belong to the M aggregation layers, any two adjacent aggregation intervals of the M aggregation intervals have a parent-child relationship, and a parent aggregation interval is an integer multiple of a child aggregation interval.

There is a plurality of methods for selecting the M aggregation intervals. Accuracy of the query range that can be queried depends on a minimum aggregation interval, and a parent aggregation interval of the minimum aggregation interval is used to further reduce time required for an aggregation operation, and improve the real-timeness of the aggregate value query.

With reference to the first aspect or the first possible implementation of the first aspect, in a second possible implementation of the first aspect, the obtaining at least one piece of data includes: receiving an $N^{th}$ piece of data in a data stream, where N is an integer greater than or equal to 1; and the separately performing aggregation calculation, based on M aggregation intervals, on an attribute value of a first target attribute of the at least one piece of data to obtain T data clusters includes: determining, based on an attribute value of a first target attribute of the $N^{th}$ piece of data, M data clusters respectively corresponding to the $N^{th}$ piece of data in the M aggregation layers; and if a data cluster corresponding to the $N^{th}$ piece of data in an $m^{th}$ aggregation layer has been generated in the database, refreshing an aggregate value of the generated data cluster based on the attribute value of the first target attribute of the $N^{th}$ piece of data, where m is a variable with a value range of $1 \leq m \leq M$; or if a data cluster corresponding to the $N^{th}$ piece of data in an $m^{th}$ aggregation layer has not been generated in the database, performing aggregation calculation on the attribute value of the first target attribute of the $N^{th}$ piece of data to generate a data cluster.

An aggregation operation is performed when each piece of data is received. Every time one piece of data is received, only M aggregation operations need to be performed, reducing an aggregation operation calculation amount, saving computing resources of a database system, and further improving real-timeness of query.

With reference to the first aspect or the first possible implementation of the first aspect, in a third possible implementation of the first aspect, the obtaining at least one piece of data includes: obtaining at least one piece of data stored in the database; and the separately performing aggregation calculation, based on M aggregation intervals, on an attribute value of a first target attribute of the at least one piece of data to obtain T data clusters includes: performing aggregation calculation on the attribute value of the first target attribute of the at least one piece of data based on an $m^{th}$ aggregation interval to obtain an $m^{th}$ aggregation layer, where the $m^{th}$ aggregation layer includes at least one data cluster, and m is a variable with a value range of $1 \leq m \leq M$.

With reference to any one of the first to the third possible implementations of the first aspect, in a fourth possible implementation of the first aspect, the method further includes: receiving a query request, where the query request includes a query range; obtaining, through query, at least two data clusters from the M aggregation layers based on the query range, where the at least two data clusters obtained through query belong to different aggregation layers, a data range of each data cluster obtained through query intersects with the query range, and a union set of the data ranges of all the data clusters obtained through query is the same as the query range; and performing aggregation calculation on aggregate values included in the at least two data clusters obtained through query, to obtain a query result.

Querying matched data clusters in different aggregation layers further reduces the time required for the aggregation operation and improves the real-timeness of the aggregate value query.

With reference to the fourth possible implementation of the first aspect, in a fifth possible implementation of the first aspect, the obtaining, through query, at least two data clusters from the M aggregation layers based on the query range specifically includes: obtaining, based on the query range and by performing matching layer by layer in descending order starting from a first aggregation layer, a data cluster that matches the query range in each aggregation layer, where the first aggregation layer is an aggregation layer with a largest aggregation interval.

With reference to any one of the first to the fifth possible implementations of the first aspect, in a sixth possible implementation of the first aspect, each aggregation layer further includes an aggregation algorithm of each aggregation layer.

With reference to any one of the first to the sixth possible implementations of the first aspect, in a seventh possible implementation of the first aspect, each aggregation layer further includes a data cluster list, and the data cluster list of each aggregation layer is used to store a data cluster included in the aggregation layer; and after the separately performing aggregation calculation, based on M aggregation intervals, on an attribute value of a first target attribute of the at least one piece of data to obtain T data clusters, the method further includes: updating a data cluster list of an aggregation layer to which each data cluster belongs.

With reference to any one of the first to the seventh possible implementations of the first aspect, in an eighth possible implementation of the first aspect, the method further includes: determining an index sequence number of each data cluster, where the index sequence number of each data cluster is used to indicate an order of the current data cluster in an aggregation layer to which the current data cluster belongs; and separately storing the index sequence number of each data cluster.

With reference to any one of the first aspect or the first to the eighth possible implementations of the first aspect, in a ninth possible implementation of the first aspect, the aggregation interval includes an aggregation time interval or an aggregation count value interval.

With reference to any one of the first aspect or the first to the ninth possible implementations of the first aspect, in a tenth possible implementation of the first aspect, the method further includes: setting a data channel, where the data channel includes an aggregation start mark, a capacity of the data channel, and a list of aggregation layers included in the data channel.

According to a second aspect, an embodiment of this application further provides a data processing method in a database. The database is used to store a plurality of pieces of data, and each piece of data includes at least one attribute. A data channel is set in the database, and the data channel includes M aggregation layers. Each aggregation layer corresponds to one aggregation interval, and M aggregation intervals are different from each other. The method includes: refreshing data clusters in the M aggregation layers when an $N^{th}$ piece of data in a data stream enters the data channel, where N is an integer greater than or equal to 1; and storing the M data clusters. The refreshing includes: obtaining, based on an attribute value of a first target attribute of the $N^{th}$ piece of data, M data clusters respectively corresponding to the $N^{th}$ piece of data in the M aggregation layers; and if a data cluster corresponding to the $N^{th}$ piece of data in an $m^{th}$ aggregation layer has been generated in the database, refreshing an aggregate value of the generated data cluster based on the attribute value of the first target attribute of the $N^{th}$ piece of data; or if a data cluster corresponding to the $N^{th}$ piece of data in an $m^{th}$ aggregation layer has not been generated in the database, performing aggregation calculation based on the attribute value of the first target attribute of the $N^{th}$ piece of data to generate a data cluster, where m is a variable with a value range of $1 \leq m \leq M$.

The plurality of aggregation intervals are selected, and the at least one piece of data in the database is aggregated based on the plurality of aggregation intervals, so that the data clusters stored in the database have data ranges with different attribute value spans. Therefore, when an aggregate value is queried based on a data cluster stored in the database, real-timeness of aggregate value query is improved while accuracy of a query range is ensured. An aggregation operation is performed when each piece of data enters the data channel. Every time one piece of data is received, only M aggregation operations need to be performed, reducing an aggregation operation calculation amount, saving computing resources of a database system, and further improving real-timeness of query.

With reference to the second aspect, in a first possible implementation of the second aspect, the data channel further includes an aggregation start mark and capacity information, and the method further includes: determining a data range of the data channel based on the aggregation start mark and a capacity of the data channel, and performing a step of refreshing the data clusters in the M aggregation layers after determining that an attribute value of a second target attribute of the $N^{th}$ piece of data belongs to the data range of the data channel.

Actually, a service requirement usually focuses only on an aggregate value of data that belongs to a specific data range in the database. The aggregation start mark and the capacity information of the data channel limit an amount of data that enters the data channel, reducing consumption of computing and storage resources of the database system.

With reference to the first possible implementation of the second aspect, in a second possible implementation of the second aspect, the method further includes: when the capacity information of the data channel and/or the aggregation start mark of the data channel is refreshed, deleting an aged data cluster at the M aggregation layers based on refreshed capacity information of the data channel or a refreshed aggregation start mark of the data channel.

Further, in some scenarios, the data range of the data channel changes with time or an amount of data that enters the database. With a change of the data range of the data channel, an aged data cluster appears in the data channel.

Deleting the aged data cluster may further reduce consumption of the computing and storage resources of the database system.

With reference to any one of the second aspect or the first or the second possible implementation of the second aspect, in a third possible implementation of the second aspect, each aggregation layer includes a list of data clusters included in the aggregation layer. After the performing aggregation calculation based on the attribute value of the first target attribute of the $N^{th}$ piece of data to generate a data cluster, the method further includes: updating a data cluster list of the $m^{th}$ aggregation layer.

With reference to any one of the second aspect or the first to the third possible implementations of the second aspect, in a fourth possible implementation of the second aspect, the method further includes: determining an index sequence number of each of the M data clusters, where the index sequence number of each data cluster is used to indicate an order of the current data cluster in an aggregation layer to which the current data cluster belongs; and separately storing the index sequence number of each data cluster.

With reference to any one of the second aspect or the first to the fourth possible implementations of the second aspect, in a fifth possible implementation of the second aspect, the database stores T data clusters, where the T data clusters are obtained by separately performing aggregation calculation on an attribute value of a first target attribute of the at least one piece of data based on the M aggregation intervals, the T data clusters belong to the M aggregation layers, and T≥M. The method further includes: receiving a query request, where the query request includes a query range; obtaining, through query, at least two of the T data clusters from the M aggregation layers based on the query range, where the at least two data clusters obtained through query belong to different aggregation layers, a data range of each data cluster obtained through query intersects with the query range, and a union set of the data ranges of all the data clusters obtained through query is the same as the query range; and performing aggregation calculation on aggregate values included in the at least two data clusters obtained through query, to obtain a query result.

Querying matched data clusters in different aggregation layers further reduces time required for the aggregation operation and improves the real-timeness of the aggregate value query.

With reference to the fifth possible implementation of the second aspect, in a sixth possible implementation of the second aspect, the obtaining, through query, at least two of the T data clusters from the M aggregation layers based on the query range specifically includes: obtaining, based on the query range and by performing matching layer by layer in descending order starting from a first aggregation layer, a data cluster that matches the query range in each aggregation layer, where the first aggregation layer is an aggregation layer with a largest aggregation interval.

With reference to any one of the second aspect or the first to the sixth possible implementations of the second aspect, in a seventh possible implementation of the second aspect, the aggregation interval includes an aggregation time interval or an aggregation count value interval.

According to a third aspect, an embodiment of this application provides a data processing device, where the device includes an obtaining unit, an aggregation unit, and a storage unit. The obtaining unit is configured to obtain at least one piece of data, where each piece of data includes at least one attribute. The obtaining unit is configured to separately perform aggregation calculation, based on M aggregation intervals, on an attribute value of a first target attribute of the at least one piece of data to obtain T data clusters, where the M aggregation intervals are different from each other, each data cluster includes an aggregate value, the aggregate value of each data cluster is obtained by performing aggregation calculation on the attribute value of the first target attribute based on an aggregation interval corresponding to the data cluster, M is an integer greater than or equal to 2, and T≥M. The storage unit is configured to store the T data clusters.

The plurality of aggregation intervals are selected, and the at least one piece of data in a database is aggregated based on the plurality of aggregation intervals, so that the data clusters stored in the database have data ranges with different attribute value spans. Therefore, when an aggregate value is queried based on a data cluster stored in the database, real-timeness of aggregate value query is improved while accuracy of a query range is ensured.

With reference to the third aspect, in a first possible implementation of the third aspect, the obtaining unit is further configured to preset M aggregation layers, where each aggregation layer corresponds to one aggregation interval, the T data clusters belong to the M aggregation layers, any two adjacent aggregation intervals of the M aggregation intervals have a parent-child relationship, and a parent aggregation interval is an integer multiple of a child aggregation interval.

There is a plurality of methods for selecting the M aggregation intervals. Accuracy of the query range that can be queried depends on a minimum aggregation interval, and a parent aggregation interval of the minimum aggregation interval is used to further reduce time required for an aggregation operation, and improve the real-timeness of the aggregate value query.

With reference to the third aspect or the first possible implementation of the third aspect, in a second possible implementation of the third aspect, that the obtaining unit is configured to obtain at least one piece of data includes: receiving an $N^{th}$ piece of data in a data stream, where N is an integer greater than or equal to 1; and that the obtaining unit is configured to separately perform aggregation calculation, based on M aggregation intervals, on an attribute value of a first target attribute of the at least one piece of data to obtain T data clusters includes: determining, based on an attribute value of a first target attribute of the $N^{th}$ piece of data, M data clusters respectively corresponding to the $N^{th}$ piece of data in the M aggregation layers; and if a data cluster corresponding to the $N^{th}$ piece of data in an $m^{th}$ aggregation layer has been generated in the database, refreshing an aggregate value of the generated data cluster based on the attribute value of the first target attribute of the $N^{th}$ piece of data, where m is a variable with a value range of 1≤m≤M; or if a data cluster corresponding to the $N^{th}$ piece of data in an $m^{th}$ aggregation layer has not been generated in the database, performing aggregation calculation on the attribute value of the first target attribute of the $N^{th}$ piece of data to generate a data cluster.

An aggregation operation is performed when each piece of data is received. Every time one piece of data is received, only M aggregation operations need to be performed, reducing an aggregation operation calculation amount, saving computing resources of a database system, and further improving real-timeness of query.

With reference to the third aspect or the first possible implementation of the third aspect, in a third possible implementation of the third aspect, that the obtaining unit is configured to obtain at least one piece of data includes:

obtaining at least one piece of data stored in the database; and that the obtaining unit is configured to separately perform aggregation calculation, based on M aggregation intervals, on an attribute value of a first target attribute of the at least one piece of data to obtain T data clusters includes: performing aggregation calculation on the attribute value of the first target attribute of the at least one piece of data based on an $m^{th}$ aggregation interval to obtain an $m^{th}$ aggregation layer, where the $m^{th}$ aggregation layer includes at least one data cluster, and m is a variable with a value range of $1 \le m \le M$.

With reference to any one of the first to the third possible implementations of the third aspect, in a fourth possible implementation of the third aspect, the device further includes a query unit. The query unit is configured to: receive a query request, where the query request includes a query range; obtain, through query, at least two data clusters from the M aggregation layers based on the query range, where the at least two data clusters obtained through query belong to different aggregation layers, a data range of each data cluster obtained through query intersects with the query range, and a union set of the data ranges of all the data clusters obtained through query is the same as the query range; and perform aggregation calculation on aggregate values included in the at least two data clusters obtained through query, to obtain a query result.

Querying matched data clusters in different aggregation layers further reduces the time required for the aggregation operation and improves the real-timeness of the aggregate value query.

With reference to the fourth possible implementation of the third aspect, in a fifth possible implementation of the third aspect, that the query unit is configured to obtain, through query, at least two data clusters from the M aggregation layers based on the query range specifically includes: obtaining, based on the query range and by performing matching layer by layer in descending order starting from a first aggregation layer, a data cluster that matches the query range in each aggregation layer, where the first aggregation layer is an aggregation layer with a largest aggregation interval.

With reference to any one of the first to the fifth possible implementations of the third aspect, in a sixth possible implementation of the third aspect, each aggregation layer further includes an aggregation algorithm of each aggregation layer.

With reference to any one of the first to the sixth possible implementations of the third aspect, in a seventh possible implementation of the third aspect, each aggregation layer further includes a data cluster list, and the data cluster list of each aggregation layer is used to store a data cluster included in the aggregation layer; and after the separately performing aggregation calculation, based on M aggregation intervals, on an attribute value of a first target attribute of the at least one piece of data to obtain T data clusters, the obtaining unit is further configured to update a data cluster list of an aggregation layer to which each data cluster belongs.

With reference to any one of the first to the seventh possible implementations of the third aspect, in an eighth possible implementation of the third aspect, the storage unit is further configured to: determine an index sequence number of each data cluster, where the index sequence number of each data cluster is used to indicate an order of the current data cluster in an aggregation layer to which the current data cluster belongs; and separately store the index sequence number of each data cluster.

With reference to any one of the third aspect or the first to the eighth possible implementations of the third aspect, in a ninth possible implementation of the third aspect, the aggregation interval includes an aggregation time interval or an aggregation count value interval.

With reference to any one of the third aspect or the first to the ninth possible implementations of the third aspect, in a tenth possible implementation of the third aspect, the obtaining unit is further configured to set a data channel, where the data channel includes an aggregation start mark, a capacity of the data channel, and a list of aggregation layers included in the data channel.

According to a fourth aspect, an embodiment of this application further provides a data processing device. The data processing device is configured to process at least one piece of data in a database, where each piece of data includes at least one attribute. A data channel is set in the database, and the data channel includes M aggregation layers. Each aggregation layer corresponds to one aggregation interval, and M aggregation intervals are different from each other. The device includes a data obtaining unit, an aggregation unit, and a storage unit. The obtaining unit is configured to obtain an $N^{th}$ piece of data in a data stream that enters the data channel. The obtaining unit is configured to refresh data clusters in the M aggregation layers, where N is an integer greater than or equal to 1. The refreshing includes: obtaining, based on an attribute value of a first target attribute of the $N^{th}$ piece of data, M data clusters respectively corresponding to the $N^{th}$ piece of data in the M aggregation layers; and if a data cluster corresponding to the $N^{th}$ piece of data in an $m^{th}$ aggregation layer has been generated in the database, refreshing an aggregate value of the generated data cluster based on the attribute value of the first target attribute of the $N^{th}$ piece of data; or if a data cluster corresponding to the $N^{th}$ piece of data in an $m^{th}$ aggregation layer has not been generated in the database, performing aggregation calculation based on the attribute value of the first target attribute of the $N^{th}$ piece of data to generate a data cluster, where m is a variable with a value range of $1 \le m \le M$. The storage unit is configured to store the M data clusters.

The plurality of aggregation intervals are selected, and the at least one piece of data in the database is aggregated based on the plurality of aggregation intervals, so that the data clusters stored in the database have data ranges with different attribute value spans. Therefore, when an aggregate value is queried based on a data cluster stored in the database, real-timeness of aggregate value query is improved while accuracy of a query range is ensured. An aggregation operation is performed when each piece of data enters the data channel. Every time one piece of data is received, only M aggregation operations need to be performed, reducing an aggregation operation calculation amount, saving computing resources of a database system, and further improving real-timeness of query.

With reference to the fourth aspect, in a first possible implementation of the fourth aspect, the data channel further includes an aggregation start mark and capacity information. The obtaining unit is further configured to: determine a data range of the data channel based on the aggregation start mark and a capacity of the data channel, and perform a step of refreshing the data clusters in the M aggregation layers after determining that an attribute value of a second target attribute of the $N^{th}$ piece of data belongs to the data range of the data channel.

Actually, a service requirement usually focuses only on an aggregate value of data that belongs to a specific data range in the database. The aggregation start mark and the capacity information of the data channel limit an amount of data that enters the data channel, reducing consumption of computing and storage resources of the database system.

With reference to the first possible implementation of the fourth aspect, in a second possible implementation of the fourth aspect, the storage unit is further configured to: refresh the capacity information of the data channel or the aggregation start mark of the data channel; and delete an aged data cluster at the M aggregation layers based on refreshed capacity information of the data channel or a refreshed aggregation start mark of the data channel.

Further, in some scenarios, the data range of the data channel changes with time or an amount of data that enters the database. With a change of the data range of the data channel, an aged data cluster appears in the data channel. Deleting the aged data cluster may further reduce consumption of the computing and storage resources of the database system.

With reference to any one of the fourth aspect or the first or the second possible implementation of the fourth aspect, in a third possible implementation of the fourth aspect, each aggregation layer includes a list of data clusters included in the aggregation layer. After the performing aggregation calculation based on the attribute value of the first target attribute of the $N^{th}$ piece of data to generate a data cluster, the storage unit is further configured to update a data cluster list of the $m^{th}$ aggregation layer.

With reference to any one of the fourth aspect or the first to the third possible implementations of the fourth aspect, in a fourth possible implementation of the fourth aspect, the storage unit is further configured to determine an index sequence number of each of the M data clusters, where the index sequence number of each data cluster is used to indicate an order of the current data cluster in an aggregation layer to which the current data cluster belongs; and the storage unit is further configured to separately store the index sequence number of each data cluster.

With reference to any one of the fourth aspect or the first to the fourth possible implementations of the fourth aspect, in a fifth possible implementation of the fourth aspect, the database stores T data clusters, where the T data clusters are obtained by separately performing aggregation calculation on an attribute value of a first target attribute of the at least one piece of data based on the M aggregation intervals, the T data clusters belong to the M aggregation layers, and T≥M. The device further includes a query unit, and the query unit is configured to: receive a query request, where the query request includes a query range; obtain, through query, at least two of the T data clusters from the M aggregation layers based on the query range, where the at least two data clusters obtained through query belong to different aggregation layers, a data range of each data cluster obtained through query intersects with the query range, and a union set of the data ranges of all the data clusters obtained through query is the same as the query range; and perform aggregation calculation on aggregate values included in the at least two data clusters obtained through query, to obtain a query result.

Querying matched data clusters in different aggregation layers further reduces time required for the aggregation operation and improves the real-timeness of the aggregate value query.

With reference to the fifth possible implementation of the fourth aspect, in a sixth possible implementation of the fourth aspect, that the query unit is configured to obtain, through query, at least two of the T data clusters from the M aggregation layers based on the query range specifically includes: obtaining, based on the query range and by performing matching layer by layer in descending order starting from a first aggregation layer, a data cluster that matches the query range in each aggregation layer, where the first aggregation layer is an aggregation layer with a largest aggregation interval.

With reference to any one of the fourth aspect or the first to the sixth possible implementations of the fourth aspect, in a seventh possible implementation of the fourth aspect, the aggregation interval includes an aggregation time interval or an aggregation count value interval.

According to a fifth aspect, an embodiment of this application provides a computing device. The computing device includes a processor and a memory, and the processor executes a program instruction in the memory to implement the various methods in the first aspect.

According to a sixth aspect, an embodiment of this application provides a computing device. The computing device includes a processor and a memory, and the processor executes a program instruction in the memory to implement the various methods in the second aspect.

According to a seventh aspect, an embodiment of this application provides a computer program product and a non-volatile computer readable storage medium, where the computer program product and the non-volatile computer readable storage medium include a computer instruction, and a computing device executes the computer instruction to implement the various methods in the first aspect of the embodiments of this application.

According to an eighth aspect, an embodiment of this application provides a computer program product and a non-volatile computer readable storage medium, where the computer program product and the non-volatile computer readable storage medium include a computer instruction, and a computing device executes the computer instruction to implement the various methods in the second aspect of the embodiments of this application.

DESCRIPTION OF EMBODIMENTS

Figure 1A:
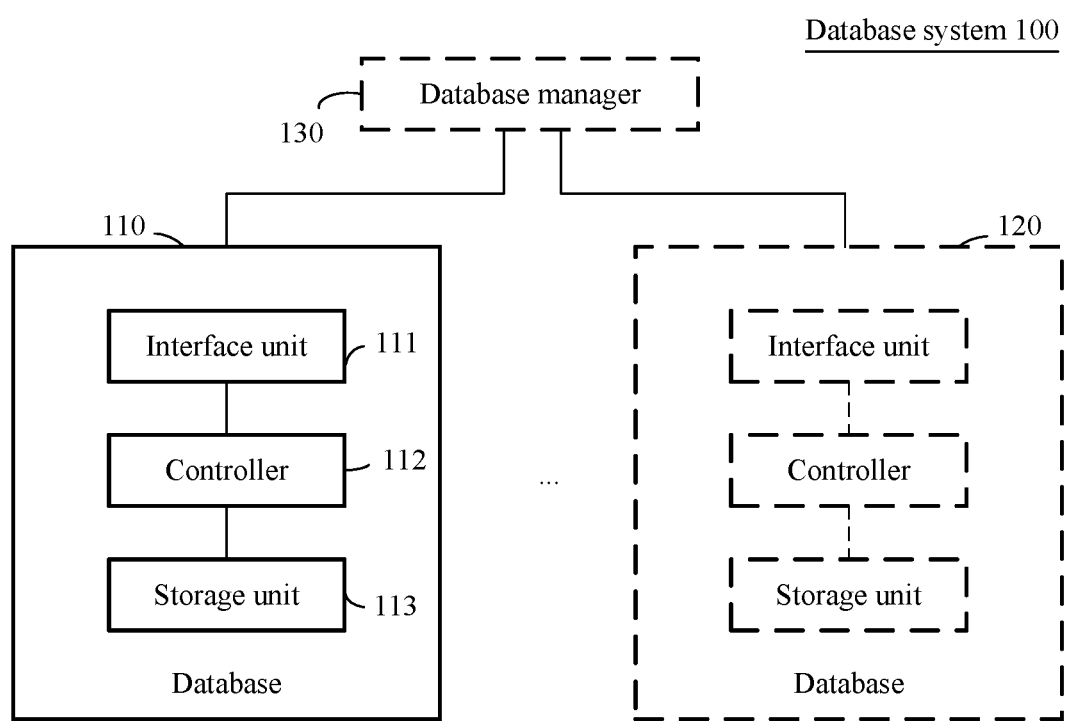
FIG. 1a is a schematic diagram of a database system according to an embodiment of this application.

A database is a warehouse in which data is organized, stored, and managed. A database system in embodiments of this application is a database system 100 shown in FIG. 1a. A database 110 in the database system 100 includes an interface unit 111, a controller 112, and a storage unit 113. The interface unit 111 provides an interface for interaction between the database 110 and an external device. Data is written into the database 110 by using the interface unit 111, and the external device reads, by using the interface unit 111, the data stored in the database 110. In addition, the interface unit 111 also receives an instruction or a request from the external device, to perform a related operation on the data stored in the database 110. The data written by using the interface unit 111 includes service data and the like. When the interface unit 111 receives an instruction, a request, or data from the external device, the controller 112 performs a corresponding instruction operation based on the received instruction, request, or data, for example, stores data or queries data. The storage unit 113 is configured to store the data that is written into the database 110 by using the interface unit 111. In a process in which the controller 112 writes data into the storage unit 113, related data for writing the data may be further generated. Optionally, the storage unit 113 may be further configured to store the related data for writing the data. In the embodiments of this application, the external device may be a client, an application program, or any functional module that interacts with the database, and is not limited to a computing device independent of a computing device to which the database belongs. The external device and the database may be deployed in the same computing device, and this is not limited in the embodiments of this application.

Optionally, in addition to the database 110, the database system further includes at least one other database and a database manager. For example, in FIG. 1a, another database 120 and a database manager 130 are shown. In this case, the database system 100 is a distributed database. When the database system 100 is a distributed database, the database system 100 includes at least two databases. Architectures of the one or more databases 120 are the same as that of the foregoing database 110. The databases are located in different computing devices, and the different computing devices may be deployed in a same equipment room, or may be deployed at different places. The databases in the different computing devices are connected to each other through a network, to form the database system 100. The database manager 130 manages and schedules the databases in the database system 100. For example, after receiving data or an instruction, the database manager 130 delivers the received data or instruction to at least one database, so that a controller in the at least one database receives and stores the data or performs an instruction operation by using the interface unit.

Figure 1B:
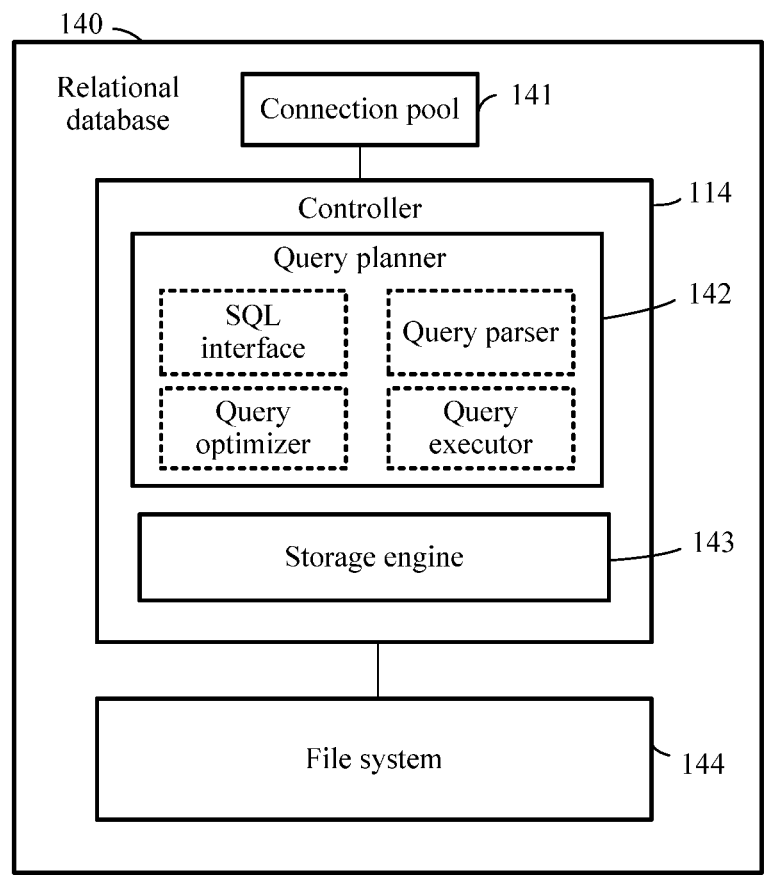
FIG. 1b is a schematic diagram of a relational database according to an embodiment of this application.

Optionally, a database in the database system 100 may be a relational database 140 shown in FIG. 1b. The relational database 140 is constructed by using a structured query language (SQL), and an access request and an instruction of the relational database 140 are SQL-based. As shown in FIG. 1b, the interface unit is a connection pool 141. The connection pool 141 manages an access connection by an external device (not shown) to the relational database 140, including allocation, release, and the like of a connection.

The connection pool 141 receives an access request from the external device, and allocates a connection to the external device. A controller 114 includes a query planner 142 and a storage engine 143. The query planner converts an SQL-based access request or instruction into fast-executing code, and executes the converted code. Optionally, the query planner includes an SQL interface, a query parser, a query optimizer, and a query executor. The SQL interface is configured to receive an SQL access request or instruction. The query parser is configured to check whether the SQL access request or instruction is legal. The query optimizer is configured to optimize the SQL access request or instruction, enabling relatively high execution efficiency of the SQL access request or instruction. The query executor is configured to compile and execute the code converted from the SQL access request or instruction. The storage engine 143 is configured to store data related to the code into a file system 144 based on the converted code. The file system 144 is the storage unit 113 in FIG. 1a. In the relational database 140, data is stored in the file system 144 in a form of a file based on a specific data structure.

A data stream is a series of dynamic data aggregations that are infinite in terms of time distribution and quantity. Usually, the database 110 receives data in a data stream, and processes the data in the data stream, where the processing includes storage, aggregation, and the like. The data stored in the database 110 includes data that has at least one attribute. The data that has at least one attribute is also referred to as structured data. The data attribute is used to record a value of the data in terms of a specific dimension, namely, an attribute value. In an example of real-time risk control of financial transactions, data of each transaction is stored in the database system, and data used to indicate one transaction generally has a plurality of dimension values, including time of transaction generation, a transaction volume, a transaction account, an operator who performs a transaction, and the like. Therefore, a timestamp indicating the time of transaction generation, magnitude of the transaction volume, an identifier of the transaction account, and a name of the operator are correspondingly recorded in a transaction time attribute, a transaction volume attribute, a transaction account attribute, and an operator attribute of the transaction data. One piece of data that has at least one attribute may be understood as one row in a bi-dimensional table that has at least one column. Each column in the bi-dimensional table is an attribute of the piece of data, and an attribute value of each attribute is a value in a corresponding column in the row.

Querying an aggregate value of the data in the database system is an important function of the database system. The following describes aggregation calculation and the aggregate value. One group of to-be-aggregated data is a group of data that has at least one attribute, and aggregating the group of data means aggregating one attribute of the group of data. In the embodiments of this application, when the aggregation calculation is performed, an attribute selected from at least one attribute of data is referred to as a first target attribute. The first target attribute may also be referred to as an aggregation attribute or the like, and this is not limited in the embodiments of this application. Specifically, one group of to-be-aggregated data has one corresponding group of attribute values of the first target attribute, and performing aggregation calculation on the attribute values of the first target attribute of this group of data means performing calculation on one group of attribute values of the first target attribute corresponding to this group of data, to obtain a value from the group of attribute values of the first target attribute. The group of attribute values of the first target attribute is one group of attribute values. Correspondingly, the value obtained from the group of attribute values is an aggregate value obtained by performing aggregation calculation on the attribute values of the first target attribute. An operation of obtaining the aggregate value from the group of attribute values includes but is not limited to statistical calculation and arithmetic calculation. In other words, an aggregation operation has a plurality of algorithms. The statistical calculation includes but is not limited to counting. The arithmetic calculation includes but is not limited to summation, getting a most value (which may be a maximum value or a minimum value), getting a median, getting an average, and the like. The first target attribute in the embodiments of this application refers to one of at least one attribute on which aggregation calculation is performed when the aggregation calculation is performed on one group of data that has the at least one attribute. In other words, in the at least one attribute that the data has, an attribute whose attribute value needs to be subject to aggregation calculation is the first target attribute.

The following describes aggregation calculation by using an example.

Counting aggregation calculation is used as an example. The aggregation calculation, namely, counting, may yield a total amount of data included in the group of data. Counting is performed on an attribute value of any attribute of this group of data, counting a total quantity of attribute values included in the group of attribute values, namely, a total amount of the data included in the group of data, or an aggregate value obtained through the aggregation calculation. When the aggregation calculation is counting, the first target attribute may be any attribute that one group of to-be-aggregated data has. For example, a database system that records violation information has a function of querying a total quantity of violation vehicles within a specific period of time. The total quantity of violation vehicles is an aggregate value obtained by counting attribute values of any attribute of one group of violation data within a specific period of time stored in the database system.

Getting the most value in aggregation calculation is used as an example. The aggregation calculation, namely, getting the most value, may yield the most value in a group of attribute values of the first target attribute corresponding to the group of data. Getting the most value is performed on the attribute value of the first target attribute of the group of data, and the first target attribute may be one of the at least one attribute that the data has. For example, a database system that records bank transaction information has a function of querying a maximum volume of several transactions. A transaction volume is selected as the first target attribute, and a maximum volume is an aggregate value obtained by performing aggregation calculation on the attribute value of the first target attribute, namely, the transaction volume, of one group of transaction data in the several transactions stored in the database system.

For brevity of description, in the embodiments of this application, aggregation calculation on one group of data refers to aggregation calculation on an attribute value of a first target attribute of the group of data. An aggregate value of the group of data is an aggregate value obtained by performing aggregation calculation on the attribute value of the first target attribute of the group of data.

In many cases, out of a service requirement, for example, real-time monitoring of vehicle violation behavior or analysis of bank transaction behavior, an aggregate value of a large amount of data entering a database system needs to be obtained in real time. However, with the development of technologies, the scale of a database system is becoming increasingly large, and so is an amount of service data entering the database system. After receiving a request for querying one group of data in the system, the database system needs to traverse a large amount of data stored in the system to obtain the group of data to be aggregated, and then perform aggregation calculation on the group of data. Traversal and aggregation of a large amount of data result in a relatively long query delay, and affect real-timeness of aggregate value queries in the database system.

Based on this, an embodiment of this application provides a data processing method. At least one piece of data stored in a database is considered as a union set of a plurality of groups of data, and aggregate values of the groups of data are separately calculated. When an aggregate value of the at least one piece of data needs to be queried, the aggregate values of the groups of data are aggregated to obtain the aggregate value of the at least one piece of data. Specifically, the database performs aggregation calculation on an attribute value of a first target attribute of the at least one piece of stored data based on an aggregation interval.

The following describes the aggregation interval. An attribute value of a second target attribute of the at least one piece of data corresponds to a data range, for example, each piece of data in a bank database system has a generation time attribute, and an attribute value of the generation time attribute is a timestamp when each piece of data is generated. Therefore, a data range that the attribute value of the generation time of at least one piece of data in the bank database system has is a range of the generation time of the at least one piece of data. The data range corresponding to the attribute value of the second target attribute of the at least one piece of data may be considered as a union set of a plurality of sub-ranges. Attribute values of all sub-ranges have a same span, each sub-range corresponds to one group of data that constitutes the at least one piece of data, and an attribute value of the second target attribute of each group of data belongs to a corresponding sub-range. Data in a bank database system is still used as an example. If the generation time of the at least one piece of data ranges from October 1 to October 30, the range from October 1 to October 30 may be considered as a union set of three ranges: October 1 to October 10, October 11 to October 20, and October 21 to October 30. Correspondingly, each of the three ranges corresponds to one group of data, and a timestamp of generation time of each group of data belongs to a corresponding range. The aggregation interval is an attribute value span of each sub-range, and is used to determine data included in each group of data whose aggregate value is to be calculated. For the second target attribute in this embodiment of this application, aggregation calculation is performed, based on a sub-range to which an attribute value of the second target attribute of data belongs, on one group of data that has at least two attributes. In other words, in the at least two attributes that the data has, an attribute that is used to determine, based on an attribute value of the attribute, a sub-range to which the attribute belongs is the second target attribute.

Aggregate values of a plurality of groups of data that constitute the at least one piece of data are calculated in advance. When an aggregate value of the data in the database needs to be queried, only the aggregate values of the plurality of groups of data need to be traversed, and the aggregate values of the groups of data are aggregated to obtain the aggregate value of the at least one piece of data.

This reduces a data volume to be traversed and aggregated when the aggregate value of the data is queried, and increases the query speed.

Optionally, the aggregation interval may be an aggregation time interval or an aggregation count value interval. Bank transaction data is used as an example. The bank transaction data has a timestamp and a count order. The timestamp indicates time of transaction data generation, and a count order field indicates an order of one piece of data in data of a system. The count order may be an order in which the piece of data is generated or an order in which the piece of data enters the system. If the aggregation interval is an aggregation time interval, for example, an aggregation time interval of five minutes, a plurality of pieces of bank transaction data may be considered, based on timestamps of the transaction data, as a union set of a plurality of groups of 0:00-0:04, 0:05-0:9, 0:10-0:14, . . . , and aggregation calculation may be performed on an attribute value of a first target attribute of bank transaction data in each group. If the aggregation interval is an aggregation count value interval, for example, an interval of 20, a plurality of pieces of bank transaction data may be considered, based on count values of the transaction data, as a union set of a plurality of groups of 1-20, 21-40, 41-60, . . . , and aggregation calculation may be performed on an attribute value of a first target attribute of bank transaction data in each group.

A plurality of aggregate values obtained by performing aggregation calculation on the attribute value of the first target attribute of the at least one piece of data based on the aggregation interval may be respectively recorded in a plurality of data clusters. Each data cluster includes one aggregate value, and the aggregate value is obtained by calculating the attribute value of the first target attribute based on the aggregation interval. Data of the aggregate value obtained by performing aggregation calculation is one group of data obtained from at least one piece of data based on the aggregation interval. Each data cluster has a corresponding data range, and the data cluster includes the aggregate value of data of the corresponding data range to which the attribute value of the second target attribute belongs. For the method for obtaining a plurality of aggregate values based on the aggregation interval, refer to the foregoing description of the aggregation interval.

When the database receives a query request that includes a query range, a to-be-queried aggregate value may be obtained by calculating the aggregate values of a plurality of data clusters. Generally, the query request includes the query range. The query range is a data range of the second target attribute of to-be-aggregated data. After receiving the query request, the database traverses the stored data clusters, and selects at least one data cluster that matches the query range, where the query range is constituted by a data range corresponding to the attribute value of the second target attribute of the at least one matched data cluster. Aggregation calculation is performed on the aggregate value included in the at least one matched data cluster to obtain an aggregate value of the attribute value of the first target attribute of the to-be-aggregated data.

Figure 2A:
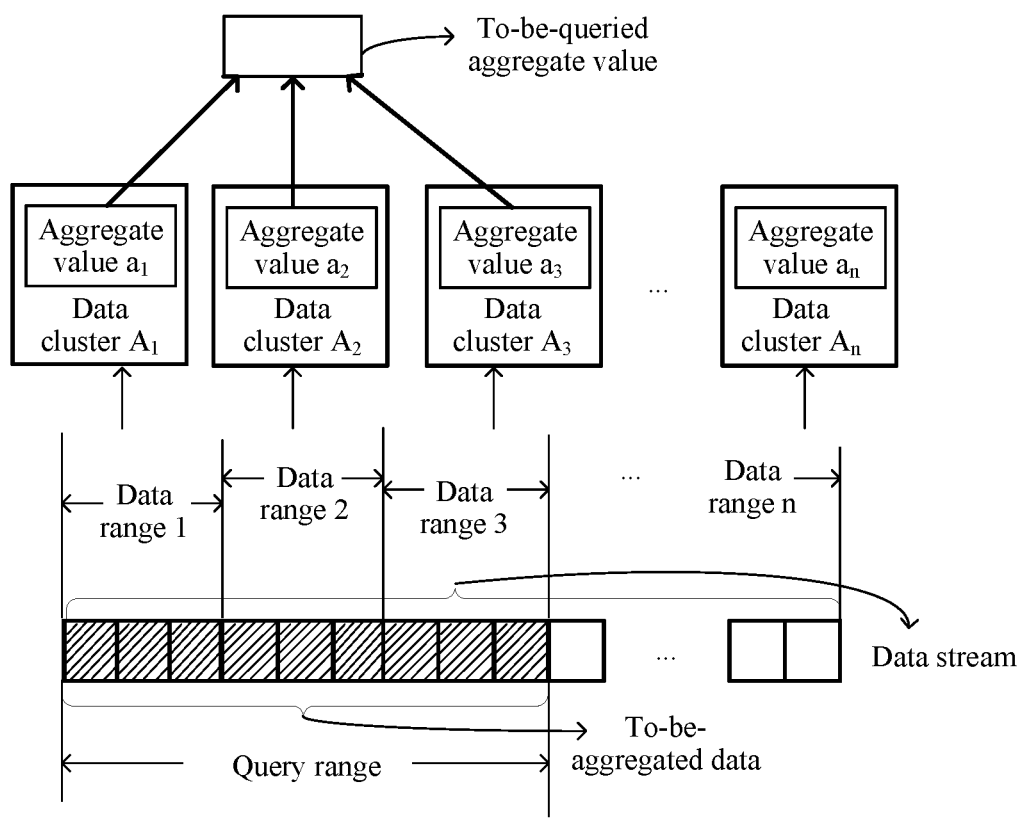
FIG. 2a is a schematic diagram of performing an aggregation operation on at least one piece of data according to an embodiment of this application.

FIG. 2a is a schematic diagram of performing aggregation calculation on an attribute value of a first target attribute of at least one piece of data based on an aggregation interval. Each aggregate value obtained by performing aggregation calculation is separately recorded in each data cluster. In FIG. 2a, for ease of drawing, at least one piece of data is arranged and drawn in order based on an attribute value of a second target attribute. Actually, at least one piece of data in a database may be stored in a storage medium or a storage device in various orders. An arranging order shown in FIG. 2a does not constitute a limitation on a storage manner of the at least one piece of data. A data range of the second target attribute is divided, based on the aggregation interval, into a plurality of data sub-ranges that are continuous and do not intersect with each other. Each data sub-range corresponds to one data cluster, and is used to record the aggregate value of data of each data sub-range in the at least one piece of data.

As shown in FIG. 2a, each piece of data in the at least one piece of data belongs to one data range based on the aggregation interval and the attribute value of the second target attribute. A span of each data range is the aggregation interval. Based on the aggregation interval, the attribute value of the first target attribute of the at least one piece of data is aggregated to obtain a data cluster A1, a data cluster A2, a data cluster A3, . . . , and a data cluster An, which respectively include an aggregate value a1, an aggregate value a2, an aggregate value a3, . . . , and an aggregate value an. Each aggregate value is obtained by performing aggregation calculation on the attribute value of the first target attribute of corresponding data, and data included in the data range is data of the data range of the data cluster to which the attribute value of the second target attribute in the at least one piece of data belongs. To-be-aggregated data may be determined based on a query range, and the to-be-aggregated data is shown in the shadow in FIG. 2a. Based on the aggregation interval, the query range is constituted by a data range 1, a data range 2, and a data range 3. Therefore, the to-be-aggregated data may be considered to be constituted by three groups of data corresponding to the three data ranges. The aggregate values a1, a2, and a3 of the three groups of data may be obtained by querying the data cluster A1, the data cluster A2, and the data cluster A3. The aggregate value of the to-be-aggregated data may be obtained by performing aggregation calculation on a1, a2, and a3, without a need to traverse the at least one piece of data.

It may be learned from FIG. 2a that, to calculate the aggregate value of the to-be-aggregated data based on aggregate values of several data clusters, the query range needs to be exactly a union set of several data ranges. In other words, an attribute value span of the query range needs to be an integer multiple of the aggregation interval. A requirement for the attribute value span of the query range brings the following problems. In many cases, for data analysis, the aggregate value in an exact query range needs to be calculated. The aggregation interval needs to be smaller as the query range becomes more exact, because if the aggregation interval has an excessively large value, the attribute value span of the query range cannot be exactly divided by the aggregation interval; to be specific, the aggregate value of the to-be-aggregated data cannot be calculated based on aggregate values of several data clusters. For example, for a database used for a banking system, the query range for which real-time aggregation calculation is performed needs to be as exact as a minute. For example, to calculate a total amount of data from one hour 11 minutes to three hours 56 minutes, a maximum grouping interval is one minute, a grouping interval greater than one minute may cause the query range unable to be split into query ranges corresponding to n aggregate values. However, selecting a relatively small grouping interval for implementing an exact query range may result in a large quantity of aggregate values corresponding to the query range. When the database receives a query request, querying a large quantity of aggregate values also affects real-timeness of the query.

Based on this, this embodiment of this application further provides a method for improving real-timeness of aggregate value query while ensuring accuracy of a query range. M aggregation intervals are selected, and aggregation calculation is separately performed on the attribute value of the first target attribute of the at least one piece of data to obtain T data clusters. One group of data clusters may be obtained based on one aggregation interval, and then M groups of data clusters may be obtained based on M aggregation intervals. T data clusters correspond to T data ranges, and the T data ranges have M different attribute value spans. When the aggregate value of the to-be-aggregated data is queried, matched data clusters are selected from different data cluster groups, and the query range is constituted by the data ranges that have different attribute value spans.

Figure 2B:
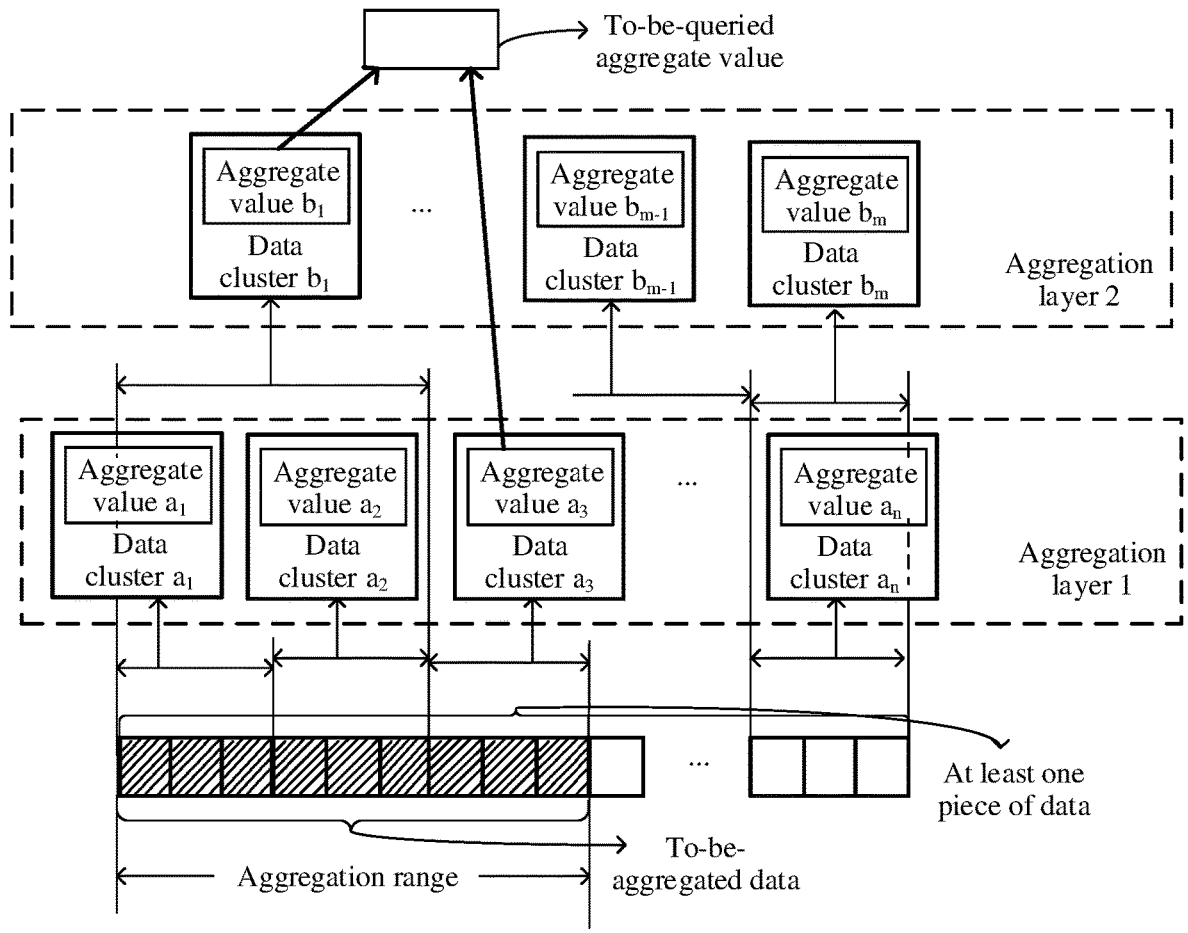
FIG. 2b is another schematic diagram of performing an aggregation operation on at least one piece of data according to an embodiment of this application.

FIG. 2b is a schematic diagram of performing aggregation calculation on attribute values of a first target attribute of at least one piece of data based on a plurality of aggregation intervals. For example, a value of M in FIG. 2b is 2. The value of M may be any integer, and is not limited in this embodiment of this application.

In FIG. 2b, the attribute value of the first target attribute of the at least one piece of data is aggregated based on an aggregation interval 1 corresponding to an aggregation layer 1, to obtain a data cluster A1, a data cluster A2, a data cluster A3, . . . , and a data cluster An. The attribute value of the first target attribute of the at least one piece of data is aggregated based on an aggregation interval 2 corresponding to an aggregation layer 2, to obtain a data cluster B1, . . . , a data cluster Bm−1, and a data cluster Bm. Each aggregate value is obtained by performing aggregation calculation on the attribute value of the first target attribute of corresponding data. Data included in a query range may be determined based on the query range, and the data included in the query range is shown in the shadow in FIG. 2b. Based on the aggregation interval 1 and the aggregation interval 2, the query range is a union set of data ranges of the data cluster B1 and the data cluster A3. Therefore, the data included in the query range is constituted by data included in the two data ranges. Therefore, the data cluster B1 and the data cluster A3 are obtained based on the query range, and aggregate values of to-be-aggregated data may be obtained by performing aggregation calculation on an aggregate value b 1 and an aggregate value a3. Selecting a plurality of aggregation intervals for aggregation may further reduce time required for aggregate value calculation and improve real-timeness of aggregate value query while ensuring accuracy of a query range.

Specifically, when aggregation calculation is separately performed on the attribute value of the first target attribute of the at least one piece of data based on M aggregation intervals to obtain T data clusters, the aggregation calculation is performed on the attribute value of the first target attribute of the at least one piece of data based on an $m^{th}$ aggregation interval and in any order of the M aggregation intervals to obtain at least one data cluster that belongs to an $m^{th}$ aggregation layer, until all the T data clusters that belong to M aggregation layers are obtained, where m is a variable, $1 \leq m \leq M$, and the $m^{th}$ aggregation layer includes the at least one data cluster.

In this embodiment of this application, a data cluster group to which a group of data clusters obtained based on one aggregation interval belongs is referred to as an aggregation layer. T data clusters belong to M aggregation layers, and each aggregation layer corresponds to one aggregation interval. Each data cluster that belongs to a same aggregation layer includes an aggregate value obtained by performing aggregation calculation on the attribute value of the first target attribute based on the aggregation interval of the aggregation layer to which the data cluster belongs, and all the data clusters that belong to the same aggregation layer have different data ranges. As shown in FIG. 2b, the data cluster B1, . . . , the data cluster Bm−1, and the data cluster Bm belong to an aggregation layer 2; and the data cluster A1, the data cluster A2, the data cluster A3, . . . , and the data cluster An belong to an aggregation layer 1.

In this embodiment of this application, there is a plurality of methods for selecting the M aggregation intervals based on a specific service requirement. The following describes a method for selecting the M aggregation intervals.

The M aggregation intervals are selected, so that any two adjacent aggregation intervals in the M aggregation intervals have a parent-child relationship. Specifically, a parent aggregation interval is an integer multiple of a child aggregation interval. In this embodiment of this application, two adjacent aggregation intervals are adjacent to each other in a sequence of the M aggregation intervals that are sorted based on values. The aggregation layer corresponding to the parent aggregation interval is referred to as a parent aggregation layer, and the aggregation layer corresponding to the child aggregation interval is referred to as a child aggregation layer. In the M aggregation intervals, there is a minimum aggregation interval, and other M−1 aggregation intervals are all parent aggregation intervals of the minimum aggregation interval. An aggregation interval that can be queried needs to be an integer multiple of at least one aggregation interval in the M aggregation intervals. In this case, accuracy of the query range that can be queried depends on the minimum aggregation interval, and a parent aggregation interval of the minimum aggregation interval is used to further reduce the time required for the aggregation operation and improve the real-timeness of the aggregate value query. As shown in FIG. 2b, the aggregation layer 2 is the parent aggregation layer of the aggregation layer 1, and an aggregation interval corresponding to the aggregation layer 2 is the parent aggregation interval of an aggregation interval corresponding to the aggregation layer 1.

In addition, a data channel is further set in the database, and the data channel includes M aggregation layers that have different aggregation intervals.

A service requirement usually focuses only on an aggregate value of data that belongs to a specific data range in the database, for example, data generated between 11:00 and 12:00 in the database, or data whose count value is between 100 and 200 in the database. Therefore, aggregation calculation is performed on only at least one piece of data whose attribute value of the first target attribute in the database belongs to the data range of the data channel. The data range of the data channel is determined by an aggregation start mark and a capacity.

Further, in some scenarios, the data range of the data channel changes with time or an amount of data that enters the database. For example, a bank database system stores all historical data, but real-time analysis and processing of the data focus only on data generated in recent eight hours or data generated in recent 10,000 transactions. When the data range of the data channel changes, data ranges of some data clusters in the T data clusters exceed an updated data range of the data channel, and some aged data clusters need to be deleted. Specifically, in the data clusters stored in the database, the data clusters whose data ranges exceed the updated data range of the data channel are searched for, and the data clusters that are found are aged data clusters. If a data range of a $k^{th}$ data cluster that is found does not intersect with the data range of the data channel, the $k^{th}$ data cluster that is found is deleted. If the data range of the $k^{th}$ data cluster that is found does not belong to the data range of the data channel but intersects with the data range of the data channel, the $k^{th}$ data cluster that is found needs to be refreshed based on an attribute value of the first target attribute of the aged data. The data range of the aged data cluster is a difference between the data range of the data channel and the data range of the $k^{th}$ data cluster that is found.

Figure 3A:
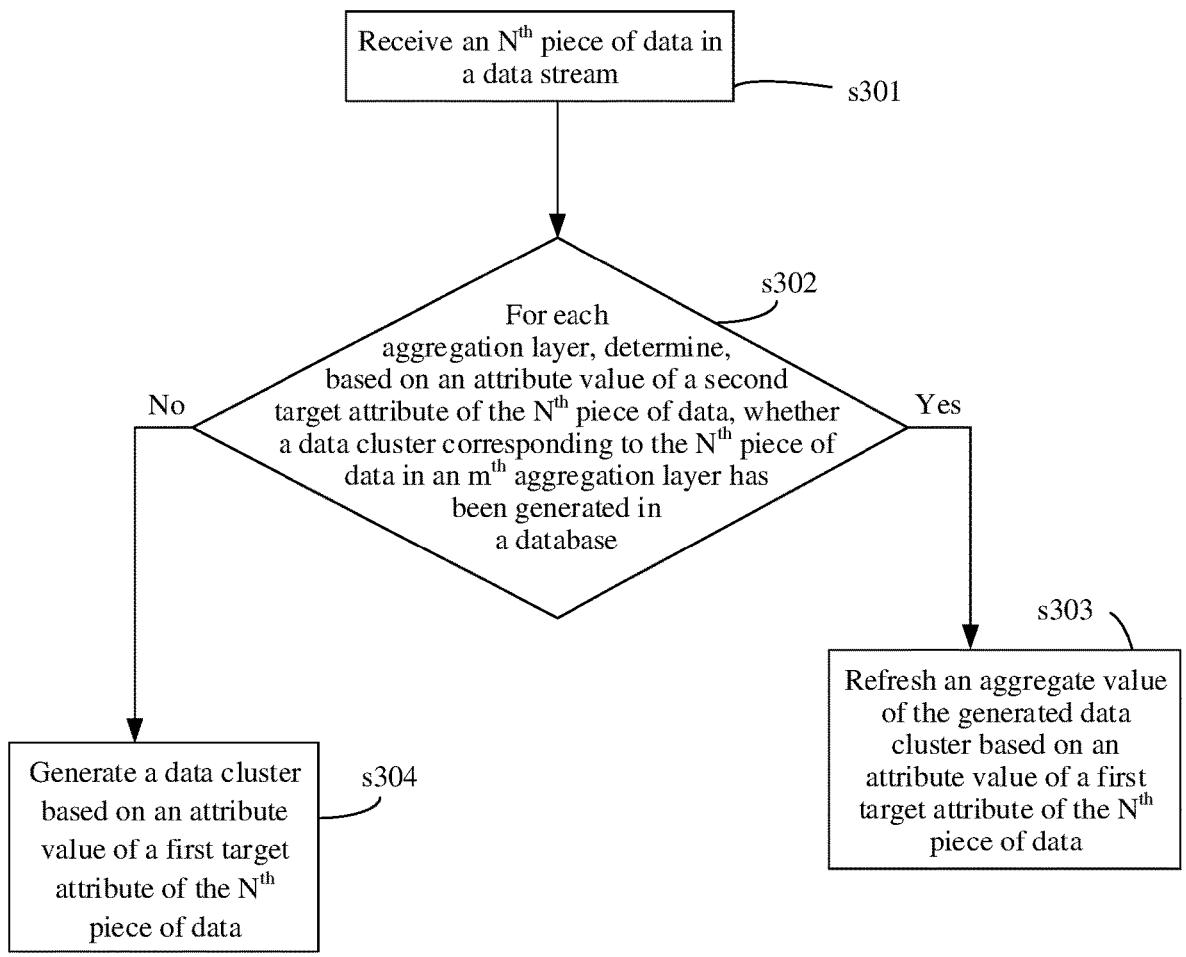
FIG. 3a is a schematic diagram of a method for obtaining T data clusters by performing aggregation calculation based on M aggregation intervals according to an embodiment of this application.

Optionally, T data clusters may be obtained by performing aggregation calculation based on M aggregation intervals in the method shown in FIG. 3a. A data channel is preset in the database, and the data channel includes M aggregation layers. Each aggregation layer corresponds to one aggregation interval, and aggregation layers correspond to different aggregation intervals. Each time one piece of data is received, a corresponding data cluster is refreshed or a corresponding data cluster is created in each aggregation layer based on the preset M aggregation intervals.

Figure 3B:
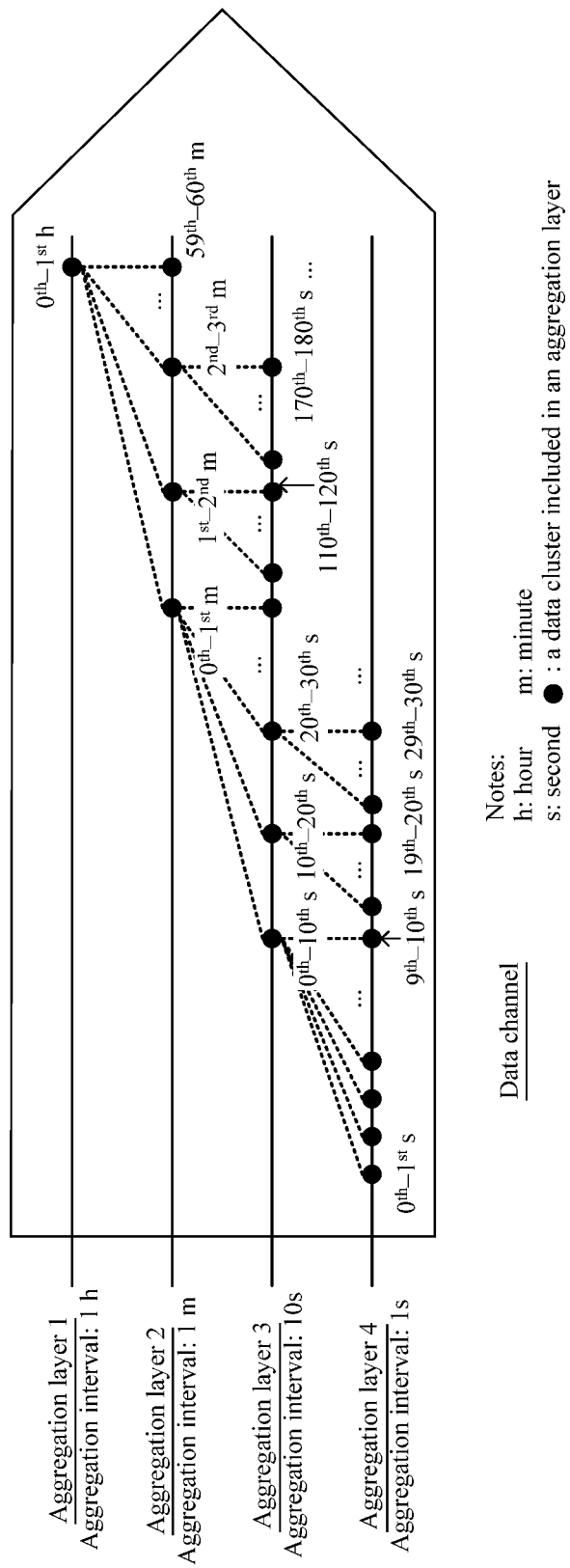
FIG. 3b is a schematic diagram of a data channel in a database system according to an embodiment of this application.

A database system used for recording a bank transaction is used as an example. FIG. 3b is a schematic diagram of a data channel in the database system. Each piece of data in the database system has a generation time attribute and a volume attribute of a transaction. The volume is the foregoing first target attribute, and transaction time is the foregoing second target attribute. For a service, data that belongs to a specific time range needs to be aggregated, to calculate a total volume of transaction data that belongs to the specific time range. The data channel shown in FIG. 3b is set in the database, and the data channel includes four aggregation layers. Time intervals corresponding to the aggregation layers are respectively one hour, one minute, 10 seconds, and one second. Each time one piece of data is received, a corresponding data cluster is refreshed or a corresponding data cluster is created in each aggregation layer based on the preset four aggregation intervals.

As shown in FIG. 3a, a specific method is as follows:

s301. Receive an $N^{th}$ piece of data in a data stream, where N is an integer greater than or equal to 1.

Before the $N^{th}$ piece of data is received, N–1 pieces of data in at least one piece of data have been stored in the database, and t data clusters are obtained by performing aggregation calculation on an attribute value of a first target attribute of the N–1 pieces of data based on the M aggregation intervals. The $N^{th}$ piece of data is received, and based on aggregate values of the t data clusters and the $N^{th}$ piece of data, aggregation calculation is performed on the attribute value of the first target attribute of N pieces of data in the at least one piece of data.

As shown in FIG. 3b, the t data clusters are obtained by performing aggregation calculation on the attribute value of the volume attributes of the N–1 pieces of data based on the four aggregation intervals in the database. Each data cluster has one data range, and the data ranges of the data clusters in a same aggregation layer do not intersect with each other. The figure shows the data ranges of some data clusters as an example. For example, an aggregation interval corresponding to an aggregation layer 4 is one second, and the data ranges of data clusters included in the aggregation layer 4 are $0^{th}$-$1^{st}$ second, $1^{st}$-$2^{nd}$ second, $9^{th}$ $10^{th}$ second, $29^{th}$-$30^{th}$ second, and the like. The aggregate value of a data cluster whose data range is the $9^{th}$-$10^{th}$ second is a total amount of data whose generation time is the $9^{th}$-$10^{th}$ second in the N–1 pieces of data. The aggregate value of a data cluster whose data range is the $0^{th}$-$10^{th}$ seconds is a total amount of data whose generation time is the $0^{th}$-$10^{th}$ seconds in the N–1 pieces of data. A data range of a data cluster in a parent aggregation layer includes a data range of at least one data cluster in a child aggregation layer. For example, a data range of $0^{th}$-$1^{st}$ minute of one data cluster in an aggregation layer 2 includes data ranges of several data clusters in an aggregation layer 3: $0^{th}$-$10^{th}$ seconds, $10^{th}$-$20^{th}$ seconds, and the like.

s302. For each aggregation layer, determine, based on the attribute value of the second target attribute of the $N^{th}$ piece of data, whether a data cluster corresponding to the $N^{th}$ piece of data in an $m^{th}$ aggregation layer has been generated in the database, where m is a variable with a value range of $1 \leq m \leq M$.

Each data cluster has a data range, and in a same aggregation layer, data ranges of the data clusters do not intersect with each other. Therefore, the $N^{th}$ piece of data corresponds to only one unique data cluster in each aggregation layer. Therefore, when aggregation calculation is performed on the attribute value of the first target attribute of the N pieces of data in the at least one piece of data, an aggregate value of each of the t data clusters does not need to be recalculated, and only the aggregate value of a matched data cluster needs to be calculated. It is assumed that generation time of the $N^{th}$ piece of data is a $115.4^{th}$ second, and the data channel shown in FIG. 3b is used as an example. Based on four different aggregation intervals, this piece of data belongs to the following data ranges: $115^{th}$-$116^{th}$ second, $110^{th}$-$120^{th}$ seconds, $1^{st}$-$2^{nd}$ minute, and $0^{th}$-$1^{st}$ hour. This piece of data corresponds to a data cluster that has the foregoing data range in each aggregation layer.

A data range of each data cluster in each aggregation layer may be determined based on an aggregation interval corresponding to the aggregation layer. The data range of each data cluster is traversed to determine the data range to which the attribute value of the first target attribute of the $N^{th}$ piece of data belongs, and then it is determined whether the data cluster corresponding to the $N^{th}$ piece of data in the $m^{th}$ aggregation layer has been generated in the database.

If yes, to be specific, the data cluster corresponding to the $N^{th}$ piece of data in the $m^{th}$ aggregation layer has been generated in the database, step s303 is performed.

s303. Refresh the generated data cluster based on the attribute value of the first target attribute of the $N^{th}$ piece of data, to obtain a refreshed data cluster. The refreshing the generated data cluster to obtain a refreshed data cluster includes: obtaining the aggregate value of the generated data cluster; performing aggregation calculation on the obtained aggregate value and the attribute value of the first target attribute of the $N^{th}$ piece of data to obtain a new aggregate value; writing the new aggregate value into the generated data cluster to overwrite an original aggregate value of the generated data cluster and obtain a refreshed data cluster.

If no, to be specific, the data cluster corresponding to the $N^{th}$ piece of data in the $m^{th}$ aggregation layer has not been generated in the database, step s304 is performed.

s304. Generate a data cluster based on the attribute value of the first target attribute of the $N^{th}$ piece of data. The step specifically includes creating a data cluster, where an aggregate value of the created data cluster is the attribute value of the first target attribute of the $N^{th}$ piece of data, and an attribute value span of a data range of the created data cluster is an aggregation interval corresponding to the $m^{th}$ aggregation layer.

In a random order, for each aggregation layer in the M aggregation layers, s303 and s304 are separately performed; to be specific, aggregation calculation may be performed on the attribute value of the first target attribute of the N pieces of data in the at least one piece of data based on the aggregate value and the $N^{th}$ piece of data in the t data clusters. Likewise, every time one piece of data in the at least one piece of data is received, the method shown in FIG. 3a is performed to obtain T aggregate values. In this case, every time one piece of data is received, an aggregation operation is performed only on a small amount of data related to M data clusters, increasing a speed of obtaining the T data clusters, and reducing a delay of aggregate value query.

When an interface unit of the database receives the $N^{th}$ piece of data, the interface unit sends the $N^{th}$ piece of data to a controller, and the controller writes the $N^{th}$ piece of data into a storage unit of the database. Optionally, while writing the $N^{th}$ piece of data into the storage unit, the controller performs s301 to s304, or after or before writing the $N^{th}$ piece of data into the storage unit, the controller may also perform s301 to s304.

Figure 4:
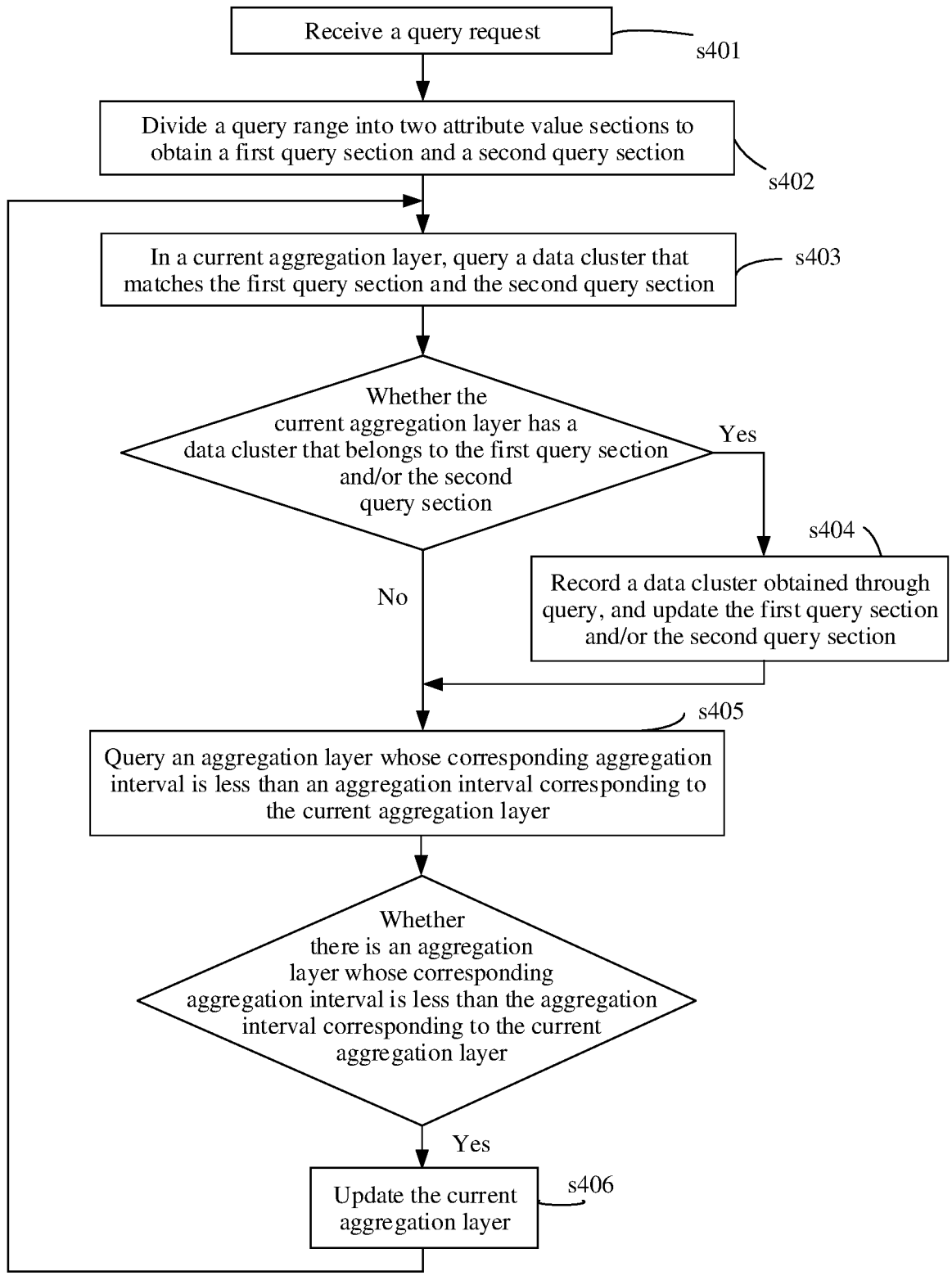
FIG. 4 is a schematic diagram of a method for selecting a group of data clusters based on a query request according to an embodiment of this application.

Based on the T data clusters of the at least one piece of data stored in the database, an embodiment of this application provides an aggregate value query method. To be specific, a group of data clusters is obtained through query based on a query range of a query request, data ranges of data clusters in the group of data clusters obtained through query do not intersect with each other but each intersects with the query range, and a union set of the data ranges of all the data clusters obtained through query is the same as the query range. Aggregation calculation is performed on aggregate values of the group of data clusters to obtain an aggregate value of to-be-aggregated data in terms of an attribute value of a first target attribute. FIG. 4 is a schematic diagram of a method for selecting the group of data clusters based on the query request.

s401. Receive the query request, where the query request includes the query range, and the query request is used to query an aggregate value of data of the query range to which an attribute value of a second target attribute of the data in the database belongs.

s402. Divide the query range into two attribute value sections to obtain a first query section and a second query section, where the first query section and the second query section indicate sections used to select the group of data clusters in the query range, and the first query section and the second query section do not intersect with each other.

A method for dividing a query range is not limited in this embodiment of this application, and an example is used for description in the following. The query range includes a left boundary and a right boundary. The left boundary of the query range is used as a left boundary of the first query section, the right boundary of the query range is used as a right boundary of the second query section, and the right boundary of the query range is used as the left boundary of the first query section and the right boundary of the second query section. In this case, the second query section is a section with a length of 0.

s403. In a current aggregation layer, query a data cluster that matches the first query section and the second query section, where a data range of the matched data cluster belongs to the first query section or the second query section.

If the first query section and the second query section that are obtained in s402 are an initialized first query section and an initialized second query section, the current aggregation layer is an initial aggregation layer, and the initial aggregation layer is an aggregation layer with a largest corresponding aggregation interval. Further, if any two adjacent aggregation intervals in M aggregation intervals have a parent-child relationship, the initial aggregation layer is an aggregation layer that does not have a parent aggregation layer in M aggregation layers.

If the current aggregation layer has a data cluster that belongs to the first query section and/or the second query section, s404 is performed.

s404. Record the data cluster obtained through query, and update the corresponding first query section and/or the corresponding second query section based on the data cluster obtained through query.

In the data cluster obtained through query, a right boundary of the first query section is updated based on a data cluster whose data range belongs to the first query section, and a left boundary of the second query section is updated based on a data cluster whose data range belongs to the second query section. Specifically, a data range of each data cluster has a left boundary and a right boundary. A smallest left boundary is selected from left boundaries of data ranges that belong to the first query section, and is used as a right boundary of an updated first query section. A largest right boundary is selected from right boundaries of data ranges that belong to the second query section, and is used as a left boundary of an updated second query section.

If the data range of the data cluster obtained through query does not belong to the first query section, the first query section does not need to be updated. Likewise, if the data range of the data cluster obtained through query does not belong to the second query section, the second query section does not need to be updated.

The first query section and the second query section are updated according to the foregoing method. The updated first query section and the updated second query section no longer include a data range of a data cluster obtained through query. A smaller aggregation interval needs to be selected, and a data cluster that matches the updated first query section and the updated second query section is queried in an aggregation layer corresponding to the smaller aggregation interval.

s405. Query an aggregation layer whose corresponding aggregation interval is less than an aggregation interval corresponding to the current aggregation layer. Further, if any two adjacent aggregation intervals in the M aggregation intervals have a parent-child relationship, a child aggregation layer of the current aggregation layer is queried.

If there is an aggregation layer whose corresponding aggregation interval is less than the aggregation interval corresponding to the current aggregation layer, a data cluster whose data range belongs to an updated first unselected range and an updated second unselected range needs to be queried in the aggregation layer whose corresponding aggregation interval is less than the aggregation interval corresponding to the current aggregation layer. Then s406 is performed.

s406. Update the current aggregation layer, where the updated current aggregation layer is an aggregation layer whose corresponding aggregation interval is less than the aggregation interval corresponding to the current aggregation layer. Further, if any two adjacent aggregation intervals of the M aggregation intervals have a parent-child relationship, the updated current aggregation layer is a child aggregation layer of the current aggregation layer. If the current aggregation layer is an initial aggregation layer, the updated current aggregation layer is a non-initial aggregation layer, where the non-initial aggregation layer is an aggregation layer whose corresponding aggregation interval is not largest in the M aggregation layers.

After step s406 is performed, the first query section and/or the second query section is updated, and the current aggregation layer is updated. Step s403 is performed to query the matched data cluster until there is no aggregation layer whose corresponding aggregation interval is less than the aggregation interval corresponding to the current aggregation layer. Further, if any two adjacent aggregation intervals of the M aggregation intervals have a parent-child relationship, step s403 is performed to query the matched data cluster until there is no child aggregation layer for the current aggregation layer.

Further, an embodiment of this application further provides a data structure used to store a data cluster and an aggregate value. In a relational database, the data structure described in the following is used to store a data cluster, thereby further improving efficiency of data cluster storage and query.

First, the data cluster includes an aggregate value. In addition, the data cluster further needs to include an attribute used to uniquely determine each data cluster. Likewise, an aggregation layer also needs to include an attribute used to uniquely determine each aggregation layer.

The aggregation layer has a corresponding aggregation interval. The data cluster includes the aggregate value, and has a data range. In addition, the data cluster and the aggregation layer further have a correspondence, and each data cluster belongs to one unique aggregation layer.

The aggregation layer may be uniquely determined based on the aggregation interval corresponding to the aggregation layer, and the data cluster may be uniquely determined based on the data range of the data cluster. Among the aggregation interval, the data range, and the correspondence between the data cluster and the aggregation layer, a third item can be obtained based on the other two items. A data range span is the aggregation interval, and the aggregation layer to which the data cluster belongs may be determined based on the data range span of the data cluster and an aggregate value interval corresponding to each data cluster. Likewise, when the aggregation layer to which the data cluster belongs and the aggregation interval corresponding to the aggregation layer are known, the data range of the data cluster may be learned by determining a left boundary or a right boundary of the data range corresponding to the data cluster.

Optionally, the aggregation layer includes an aggregation interval and a data cluster list. The aggregation interval corresponding to the aggregation layer is recorded in an attribute, namely, the aggregation interval of the aggregation layer. The data cluster list records a list of data clusters that belong to the aggregation layer, and the data clusters that belong to the aggregation layer are obtained by performing aggregation calculation on an attribute value of a first target attribute of at least one piece of data based on the aggregation interval of the aggregation layer.

When the aggregation interval corresponding to the aggregation layer is a count value interval, a value of the count value interval corresponding to each aggregation layer may be recorded in the aggregation interval of the aggregation layer. When the aggregation interval corresponding to the aggregation layer is a time interval, because the time interval has a unit, a value of the time interval corresponding to each aggregation layer may be recorded in the aggregation interval of the aggregation layer based on a unified unit, or the unit and the value of the time interval may be separately recorded. In this case, the aggregation interval of the aggregation layer includes a time interval length and a time unit. When the aggregation interval includes the time interval length and the time unit, the time interval corresponding to the aggregation layer is recorded in different forms based on different time units. An example is used for description in the following. For example, if a time interval corresponding to an aggregation layer is 60 seconds, a time interval length of the aggregation layer is 60 and a time unit is second. Alternatively, the time interval length of the aggregation layer may be recorded as 1 and the time unit may be recorded as minute.

In addition to aggregation, the data cluster further includes a data range parameter. The data range parameter is used to determine the attribute value corresponding to the data cluster. The data range of the data cluster may be directly recorded in the data range parameter. In addition, the data range parameter may not directly record the data range of the data cluster, to reduce a stored data volume. Optionally, the left boundary or the right boundary of the data range of the data cluster is recorded in the data range parameter, and the data range of the data cluster may be obtained based on the aggregation interval of the aggregation layer to which the data cluster belongs. Optionally, the data ranges of the data clusters may also be sorted, and index sequence numbers of the data ranges are recorded in the data range parameter. In this embodiment of this application, the data ranges of the data clusters in the same aggregation layer are sorted based on a value of the left boundary or the right boundary of each data range, and the sequence number of the left boundary or the right boundary of each data range is a sequence number of the corresponding data range. The data ranges of the data clusters that belong to the same aggregation layer are selected in a continuous section based on the aggregation interval parameter of the aggregation layer. The data range of the data cluster may be determined based on the index sequence number and the aggregation interval of the aggregation layer. For example, when the aggregation interval parameter of the aggregation layer is 5, the data range of 1-5 is a first data range, the data range of 6-10 is a second data range, and so on.

Optionally, the aggregation layer further includes an aggregation algorithm attribute.

As mentioned above, an aggregation operation includes a plurality of algorithms, such as statistical calculation and an arithmetic operation. Optionally, the database stores a data cluster that is obtained by calculating at least one piece of data based on M different aggregation intervals and by using a plurality of aggregation algorithms. The aggregation algorithm used to obtain each data cluster is recorded in the aggregation layer to which the data cluster belongs. Considering that aggregate values of different to-be-aggregated data corresponding to different aggregation algorithms need to be queried, the aggregation layer further includes the aggregation algorithm, and the aggregation algorithm is used to indicate an aggregation algorithm used for aggregation calculation. In this case, the aggregation layer may be uniquely determined based on the aggregation interval parameter and the aggregation algorithm of the aggregation layer.

For example, Table 1 shows example data structures of three aggregation layers when an aggregation interval is a count value interval.

Table 2 shows example data structures of three aggregation layers when an aggregation interval is a time interval.

TABLE 1

| Aggregation interval | Data cluster list | Aggregation algorithm | ... |
|---|---|---|---|
| 5 | Data cluster 1, data cluster 2, data cluster 3, data cluster 4, ... | Summation | |

TABLE 1-continued

| Aggregation interval | Data cluster list | Aggregation algorithm | ... |
|---|---|---|---|
| 10 | Data cluster 5, data cluster 6, data cluster 7, . . . | Summation | |
| 15 | Data cluster 8, data cluster 9, . . . | Summation | |

TABLE 2

| Time interval length | Time unit | Data cluster list | Aggregation algorithm | ... |
|---|---|---|---|---|
| 30 | Second | Data cluster 1, data cluster 2, data cluster 3, data cluster 4, . . . | Summation | |
| 1 | Minute | Data cluster 5, data cluster 6, data cluster 7, . . . | Summation | |
| 5 | Minute | Data cluster 8, data cluster 9, . . . | Summation | |

Table 3 shows example data structures of three data clusters.

TABLE 3

| Data range parameter | Aggregate value | ... |
|---|---|---|
| 1-100 | 2800 | |
| 101-200 | 3899 | |
| 201-300 | 5098 | |

Table 4 shows example data structures of three data clusters, where a data range of a data cluster whose index sequence number is 1 is 1-100, a data range of a data cluster whose index sequence number is 2 is 101-200, and a data range of a data cluster whose index sequence number is 3 is 201-300.

TABLE 4

| Index sequence number | Aggregate value | ... |
|---|---|---|
| 1 | 2800 | |
| 2 | 3899 | |
| 2 | 5098 | |

The data structures shown in Table 1, Table 2, Table 3, and Table 4 are merely examples for describing a data structure of a data cluster and an aggregation layer. In addition to an attribute shown in the tables, the data cluster and the aggregation layer may further include another attribute. This is not limited in embodiments of this application.

In addition, a data channel is set in a database, and the data channel includes M aggregation layers that have different aggregation intervals.

Based on the foregoing data structure, an embodiment of this application provides a method for aggregating at least one piece of data in a database. To be specific, when an $N^{th}$ piece of data in a data stream enters the data channel, data clusters in the M aggregation layers in the data channel are refreshed. The method for refreshing the data clusters in the aggregation layers includes obtaining M data clusters that respectively correspond to the $N^{th}$ piece of data in the M aggregation layers based on an attribute value of a first target attribute of the $N^{th}$ piece of data. For details, refer to steps s302 to s304.

When each aggregation layer includes a list of data clusters that are included in the aggregation layer, and after aggregation calculation is performed based on the attribute value of the first target attribute of the $N^{th}$ piece of data to generate a data cluster, a list of data clusters of an $m^{th}$ aggregation layer further needs to be updated.

When the data cluster is the data structure shown in Table 4, and after aggregation calculation is performed based on the attribute value of the first target attribute of the $N^{th}$ piece of data to generate a data cluster, an index sequence number of each of the M data clusters needs to be further determined and stored, where the index sequence number of each data cluster is used to indicate an order of the current data cluster in an aggregation layer to which the data cluster belongs.

Based on the foregoing data structure and the foregoing method, for a method for obtaining the aggregate value based on query, refer to the foregoing method in s401 to s406.

Actually, a service requirement usually focuses only on an aggregate value of data that belongs to a specific data range in the database, for example, data generated between 11:00 and 12:00 in the database, or data whose count value is between 100 and 200 in the database. Therefore, aggregation calculation is performed on only at least one piece of data whose attribute value of the first target attribute in the database belongs to the data range of the data channel. The data range of the data channel is determined by an aggregation start mark and a capacity. In this case, before the obtaining M data clusters that respectively correspond to the $N^{th}$ piece of data in the M aggregation layers based on the attribute value of the first target attribute of the $N^{th}$ piece of data, the data range of the data channel further needs to be determined based on the aggregation start mark and the capacity of the data channel; and the data range whose attribute value of a second target attribute of the $N^{th}$ piece of data belongs to the data channel needs to be determined.

Further, in some scenarios, the data range of the data channel changes with time or an amount of data that enters the database. For example, a bank database system stores all historical data, but real-time analysis and processing of the data focus only on data generated in recent eight hours or data generated in recent 10,000 transactions. When the data range of the data channel changes, data ranges of some data clusters in the T data clusters exceed an updated data range of the data channel, and some aged data clusters need to be deleted. Specifically, in the data clusters stored in the database, the data clusters whose data ranges exceed the updated data range of the data channel are searched for, and the data clusters that are found are aged data clusters. If a data range of a $k^{th}$ data cluster that is found does not intersect with the data range of the data channel, the $k^{th}$ data cluster that is found is deleted. If the data range of the $k^{th}$ data cluster that is found does not belong to the data range of the data channel but intersects with the data range of the data channel, the $k^{th}$ data cluster that is found needs to be refreshed based on an attribute value of the first target attribute of the aged data. The data range of the aged data cluster is a difference between the data range of the data channel and the data range of the $k^{th}$ data cluster that is found.

Optionally, an update of a data channel range includes an update of an aggregation start mark and/or an update of a capacity. The data channel range is updated based on a fixed update interval, and every time after the data channel range is updated, the foregoing step of "deleting aged data clusters in M aggregations" is performed.

The data processing methods described above are used for any database in the database system. The following describes application of data processing methods, such as data cluster generation and aggregate value query, in the database system.

When the database system includes only one database, the data processing methods of the database system are described above.

When the database system includes at least two databases, each database performs aggregation calculation on at least one piece of data in each database based on an aggregation interval corresponding to at least one aggregation layer in the foregoing data processing method, to obtain at least one data cluster. After the database system receives a query request, a database manager of the database system distributes the query request to each database in the database system. Based on the foregoing data processing method and a stored data cluster or a window view, each database obtains a query result of the aggregate value request in each database, and returns the query results to the database system. The database system performs aggregation calculation on the result returned by each database, to obtain a query result of the query request in the database system.

Figure 5:
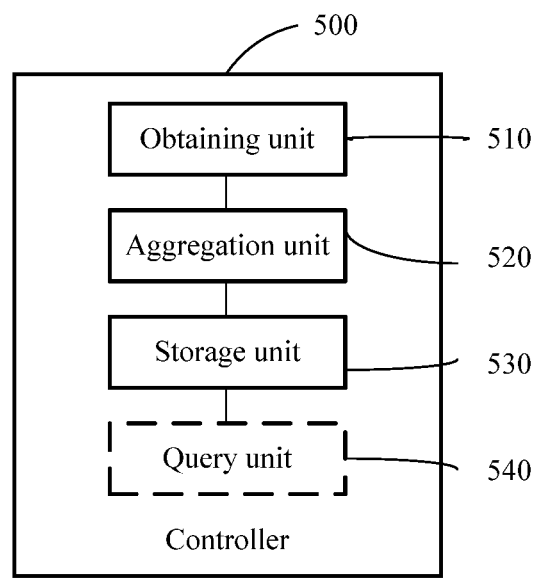
FIG. 5 is a schematic diagram of a controller according to an embodiment of this application.

An embodiment of this application further provides a controller, as shown in FIG. 5. A controller 500 includes an obtaining unit 510, an aggregation unit 520, and a storage unit 530. The controller 500 may be used as a controller 112 in a database 110 in FIG. 1a, or may be used as a controller 114 in a relational database 140 in FIG. 1b. When the controller 500 is used as the controller 114 in FIG. 1b, the obtaining unit 510, the aggregation unit 520, and the storage unit 530 are functional modules in a query planner 142.

The obtaining unit 510 is configured to obtain at least one piece of data, where each piece of data includes at least one attribute.

The aggregation unit 520 is configured to separately perform aggregation calculation, based on M aggregation intervals, on an attribute value of a first target attribute of the at least one piece of data to obtain T data clusters, where the M aggregation intervals are different from each other, each data cluster includes an aggregate value, the aggregate value of each data cluster is obtained by performing aggregation calculation on the attribute value of the first target attribute based on an aggregation interval corresponding to the data cluster, M is an integer greater than or equal to 2, and T≥M.

The storage unit 530 is configured to store the T data clusters.

Optionally, the aggregation unit 520 is further configured to preset M aggregation layers, where each aggregation layer corresponds to one aggregation interval, the T data clusters belong to the M aggregation layers, any two adjacent aggregation intervals of the M aggregation intervals have a parent-child relationship, and a parent aggregation interval is an integer multiple of a child aggregation interval.

Optionally, that the obtaining unit 510 is configured to obtain at least one piece of data includes: receiving an $N^{th}$ piece of data in a data stream, where N is an integer greater than or equal to 1. That the aggregation unit 520 is configured to separately perform aggregation calculation, based on M aggregation intervals, on an attribute value of a first target attribute of the at least one piece of data to obtain T data clusters includes: determining, based on an attribute value of a first target attribute of the $N^{th}$ piece of data, M data clusters respectively corresponding to the $N^{th}$ piece of data in the M aggregation layers; and if a data cluster corresponding to the $N^{th}$ piece of data in an $m^{th}$ aggregation layer has been generated in the database, refreshing the generated data cluster based on the attribute value of the first target attribute of the $N^{th}$ piece of data to obtain a refreshed data cluster, where m is a variable with a value range of 1≤m≤M; or if a data cluster corresponding to the $N^{th}$ piece of data in an $m^{th}$ aggregation layer has not been generated in the database, performing aggregation calculation on the attribute value of the first target attribute of the $N^{th}$ piece of data to generate a data cluster.

Optionally, that the obtaining unit 510 is configured to obtain at least one piece of data includes: obtaining at least one piece of data stored in the database. That the aggregation unit 520 is configured to separately perform aggregation calculation, based on M aggregation intervals, on an attribute value of a first target attribute of the at least one piece of data to obtain T data clusters includes: performing aggregation calculation on the attribute value of the first target attribute of the at least one piece of data based on the $m^{th}$ aggregation interval to obtain an $m^{th}$ aggregation layer, where the $m^{th}$ aggregation layer includes at least one data cluster, and m is a variable with a value range of 1≤m≤M.

Optionally, the controller 500 further includes a query unit 540, and the query unit 540 is configured to: receive a query request, where the query request includes a query range; obtain, through query, at least two data clusters from the M aggregation layers based on the query range, where the at least two data clusters obtained through query belong to different aggregation layers, a data range of each data cluster obtained through query intersects with the query range, and a union set of the data ranges of all the data clusters obtained through query is the same as the query range; and perform aggregation calculation on aggregate values included in the at least two data clusters obtained through query, to obtain a query result.

Optionally, that the query unit 540 is configured to obtain, through query, at least two data clusters from the M aggregation layers based on the query range specifically includes:

dividing the query range into two attribute value sections, to obtain a first query section and a second query section;

querying, in an initial aggregation layer, a data cluster that matches the first query section or the second query section, where a data range of the matched data cluster belongs to the first query section or the second query section, and the initial aggregation layer is an aggregation layer whose corresponding aggregation interval is largest in the M aggregation layers;

updating the first query section and the second query section based on the matched data cluster, where an updated first query section and an updated second query section are subsets of the query range, and the data range of the matched data cluster does not belong to the updated first query section or the updated second query section; and querying, in a non-initial aggregation layer, a data cluster that matches the updated first query section and the updated second query section, where the union set of the data ranges of all the data clusters obtained through query is the updated first query section and the updated second query section, and the matched data cluster and all the data clusters obtained through query are the at least two data clusters.

Optionally, after the separately performing aggregation calculation, based on M aggregation intervals, on an attribute value of a first target attribute of the at least one piece of data to obtain T data clusters, the aggregation unit 520 is further configured to update a data cluster list of an aggregation layer to which each data cluster belongs.

Optionally, the storage unit 530 is further configured to:

determine an index sequence number of each data cluster, where the index sequence number of each data cluster is used to indicate an order of the current data cluster in an aggregation layer to which the current data cluster belongs; and separately store the index sequence number of each data cluster.

Optionally, the aggregation unit 520 is further configured to set a data channel, where the data channel includes an aggregation start mark, a capacity of the data channel, and a list of aggregation layers included in the data channel.

Figure 6:
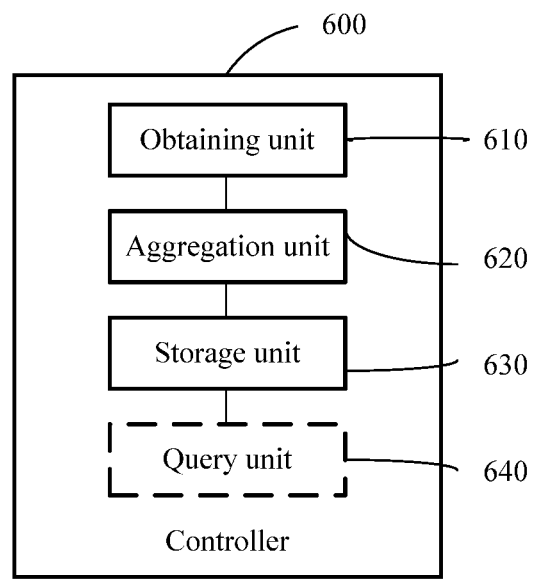
FIG. 6 is a schematic diagram of another controller according to an embodiment of this application.

An embodiment of this application further provides another controller, as shown in FIG. 6. A controller 600 includes an obtaining unit 610, an aggregation unit 620, and a storage unit 630. The controller 600 may be used as a controller 112 in a database 110 in FIG. 1a, or may be used as a controller 114 in a relational database 140 in FIG. 1b. When the controller 600 is used as the controller 114 in FIG. 1b, the obtaining unit 610, the aggregation unit 620, and the storage unit 630 are functional modules in a query planner 142.

The obtaining unit 610 is configured to obtain an $N^{th}$ piece of data in a data stream that enters the data channel.

The aggregation unit 620 is configured to:

refresh a data cluster in the M aggregation layers, where N is an integer greater than or equal to 1; and the refreshing a data cluster in the M aggregation layers includes:

obtaining, based on an attribute value of a first target attribute of the $N^{th}$ piece of data, M data clusters respectively corresponding to the $N^{th}$ piece of data in the M aggregation layers; and if a data cluster corresponding to the $N^{th}$ piece of data in an $m^{th}$ aggregation layer has been generated in the database, refreshing an aggregate value of the generated data cluster based on the attribute value of the first target attribute of the $N^{th}$ piece of data; or if a data cluster corresponding to the $N^{th}$ piece of data in an $m^{th}$ aggregation layer has not been generated in the database, performing aggregation calculation based on the attribute value of the first target attribute of the $N^{th}$ piece of data to generate a data cluster, where m is a variable with a value range of $1 \leq m \leq M$.

The storage unit 630 is configured to store the M data clusters.

Optionally, the aggregation unit 620 is further configured to:

refresh capacity information of the data channel or an aggregation start mark of the data channel; and delete an aged data cluster at the M aggregation layers based on refreshed capacity information of the data channel or refreshed aggregation start mark of the data channel.

Optionally, the storage unit 630 is further configured to:

refresh the capacity information of the data channel or the aggregation start mark of the data channel; and delete the aged data cluster at the M aggregation layers based on the refreshed capacity information of the data channel or the refreshed aggregation start mark of the data channel.

Optionally, after the performing aggregation calculation based on the attribute value of the first target attribute of the $N^{th}$ piece of data to generate a data cluster, the storage unit 630 is further configured to update a data cluster list of the $m^{th}$ aggregation layer.

Optionally, the storage unit 630 is further configured to:

determine an index sequence number of each of the M data clusters, where the index sequence number of each data cluster is used to indicate an order of the current data cluster in an aggregation layer to which the current data cluster belongs; and the storage unit 630 is further configured to separately store the index sequence number of each data cluster.

Optionally, the controller 600 further includes a query unit, and the query unit 640 is configured to:

receive a query request, where the query request includes a query range;

obtain, through query, at least two of the T data clusters from the M aggregation layers based on the query range, where the at least two data clusters obtained through query belong to different aggregation layers, a data range of each data cluster obtained through query intersects with the query range, and a union set of the data ranges of all the data clusters obtained through query is the same as the query range; and perform aggregation calculation on aggregate values included in the at least two data clusters obtained through query, to obtain a query result.

Optionally, that the query unit 640 is configured to obtain, through query, at least two of the T data clusters from the M aggregation layers based on the query range specifically includes:

dividing the query range into two attribute value sections, to obtain a first query section and a second query section;

querying, in an initial aggregation layer, a data cluster that matches the first query section or the second query section, where a data range of the matched data cluster belongs to the first query section or the second query section, and the initial aggregation layer is an aggregation layer whose corresponding aggregation interval is largest in the M aggregation layers;

updating the first query section and the second query section based on the matched data cluster, where an updated first query section and an updated second query section are subsets of the query range, and the data range of the matched data cluster does not belong to the updated first query section or the updated second query section; and querying, in a non-initial aggregation layer, a data cluster that matches the updated first query section and the updated second query section, where the union set of the data ranges of all the data clusters obtained through query is the updated first query section and the updated second query section, and the matched data cluster and all the data clusters obtained through query are the at least two data clusters.

Figure 7:
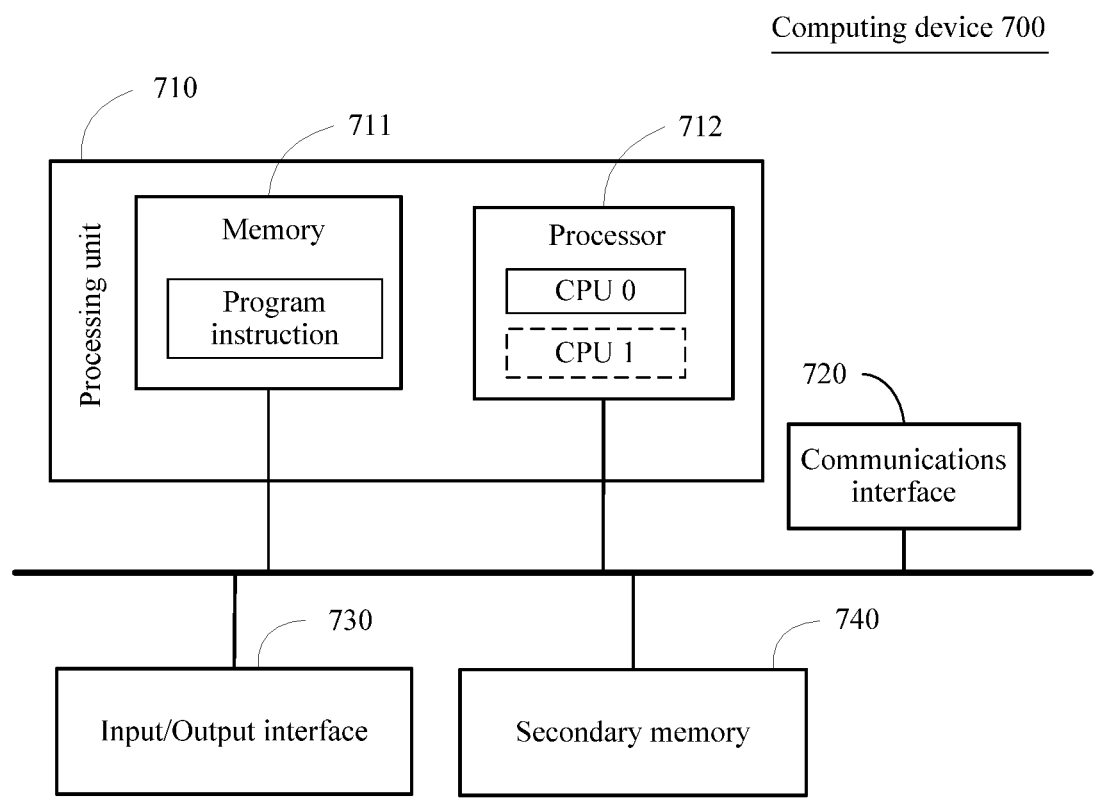
FIG. 7 is a schematic diagram of a computing device according to an embodiment of this application.

An embodiment of this application further provides a computing device, as shown in FIG. 7. A computing device 700 includes a processing unit 710 and a communications interface 720. The processing unit 710 is configured to perform an operating system and functions defined by various software programs that are run on the computing device, including the function of the controller 500 or the function of the controller 600. The communications interface 720 is configured to communicate and interact with another device, where the another device may be another computing device. Specifically, the communications interface 720 may be a network adapter card. Optionally, the computing device may further include an input/output interface 730, where the input/output interface 730 is connected to an input/output device, and is configured to receive input information and output an operation result. The input/output interface 730 may be a mouse, a keyboard, a display, an optical drive, or the like. Optionally, the computing device 700 may further include a secondary memory 740, which is generally referred to as an external memory. A storage medium of the secondary memory 740 may be a magnetic medium (for example, a floppy disk, a hard disk, or a magnetic tape), an optical medium (for example, an optical disc), or a semiconductor medium (for example, a solid-state drive), or the like. The processing unit 710 may be implemented in a plurality of specific forms. For example, the processing unit 710 may include a processor 711 and a memory 712, and the processor 711 performs a related operation according to a program instruction stored in the memory 712. The processor 711 may be a central processing unit (CPU) or a graphics processing unit (GPU), and the processor 711 may be a single-core processor or a multi-core processor. The processing unit 710 may also be implemented by independently using a logic device with built-in processing logic, for example, a field programmable gate array (FPGA) or a digital signal processor (DSP). In addition, FIG. 7 shows merely an example of the computing device. The computing device may include more or fewer components than those shown in FIG. 7, or have different component configuration manners.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces, indirect couplings or communication connections between the apparatuses or units, or electrical connections, mechanical connections, or connections in other forms.

The foregoing descriptions are merely specific embodiments of the present invention, but are not intended to limit the protection scope of the present invention. Any modification or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A data processing method in a database, wherein the method comprises:
   obtaining, using at least one processor coupled to a memory storing the database, at least one piece of data, wherein each said at least one piece of data comprises at least two attributes;
   separately performing aggregation calculation, using the at least one processor and based on M aggregation intervals, on an attribute value of a first target attribute of the at least one piece of data to obtain T data clusters, wherein the M aggregation intervals are different from each other and are intervals of a second target attribute of the at least two attributes, each data cluster of the T data clusters comprises an aggregate value, the aggregate value of said each data cluster is obtained by performing aggregation calculation on attribute values of the first target attribute of pieces of data having attribute values of the second target attribute belonging to a data range corresponding to the data cluster, a span of the data range being equal to a respective one of the M aggregation intervals, M is an integer greater than or equal to 2, and T≥M, wherein each aggregation layer of M aggregation layers corresponds to one aggregation interval of the M aggregation intervals, any two adjacent aggregation intervals of the M aggregation intervals have a parent-child relationship in which a parent aggregation interval of said any two aggregation intervals is an integer multiple of a child aggregation interval of said any two aggregation intervals;
   storing, using the at least one processor, the T data clusters in the database in the memory, wherein each data cluster of the T data clusters is stored in the database in a respective data structure that comprises the aggregate value of the each data cluster and that is associated in the database with a data structure of a corresponding one of the M aggregation layers;
   receiving, using the at least one processor, a query request, wherein the query request comprises a query range;
   obtaining from the database, through query using the at least one processor, at least two data clusters from the M aggregation layers based on the query range, wherein the obtained at least two data clusters belong to different aggregation layers, a data range of each data cluster of the obtained at least two data clusters intersects with the query range, and a union set of the data ranges of all the obtained at least two data clusters is the same as the query range; and
   performing, using the at least one processor, aggregation calculation on aggregate values comprised in the obtained at least two data clusters, to obtain a query result.

2. The method according to claim 1, further comprising: before said separately performing aggregation calculation, presetting the M aggregation layers.

3. The method according to claim 1, wherein the obtaining at least one piece of data comprises:
   receiving an $N^{th}$ piece of data in a data stream, wherein N is an integer greater than or equal to 1; and
   the separately performing aggregation calculation, based on M aggregation intervals, on an attribute value of a first target attribute of the at least one piece of data to obtain T data clusters comprises:
   determining, based on an attribute value of a second target attribute of the $N^{th}$ piece of data, M data clusters respectively corresponding to the $N^{th}$ piece of data in the M aggregation layers, wherein the determining includes, at an $m^{th}$ aggregation layer:
   if a data cluster corresponding to the $N^{th}$ piece of data in the $m^{th}$ aggregation layer has been generated in the database, refreshing an aggregate value of the generated data cluster based on the attribute value of the first target attribute of the $N^{th}$ piece of data, wherein m is a variable with a value range of 1≤m≤M; or
   if a data cluster corresponding to the $N^{th}$ piece of data in the $m^{th}$ aggregation layer has not been generated in the database, performing aggregation calculation on the attribute value of the first target attribute of the $N^{th}$ piece of data to generate a data cluster.

4. The method according to claim 1, wherein the obtaining at least one piece of data comprises:
   obtaining the at least one piece of data from the database; and
   the separately performing aggregation calculation, based on M aggregation intervals, on an attribute value of a first target attribute of the at least one piece of data to obtain T data clusters comprises:
   performing aggregation calculation on the attribute value of the first target attribute of the at least one piece of data based on an $m^{th}$ aggregation interval to obtain an $m^{th}$ aggregation layer, wherein the $m^{th}$ aggregation layer comprises at least one data cluster, and m is a variable with a value range of 1≤m≤M.

5. The method according to claim 1, wherein the obtaining, through query using the at least one processor, at least two data clusters from the M aggregation layers based on the query range comprises:
   obtaining, based on the query range and by performing matching layer by layer in descending order starting from a first aggregation layer, a data cluster that matches the query range in each aggregation layer of the M aggregation layers, wherein the first aggregation layer is an aggregation layer with a largest aggregation interval.

6. The method according to claim 2, wherein each aggregation layer further comprises an aggregation algorithm.

7. The method according to claim 2, wherein each aggregation layer of the M aggregation layers further comprises a data cluster list, and the data cluster list of each aggregation layer is used to store a data cluster comprised in the aggregation layer; and after the separately performing aggregation calculation, based on M aggregation intervals, on an attribute value of a first target attribute of the at least one piece of data to obtain T data clusters, the method further comprises:
updating the data cluster list of an aggregation layer to which each data cluster of the T data clusters belongs.

8. The method according to claim 2, wherein the method further comprises:
determining an index sequence number of each data cluster of the T data clusters, wherein the index sequence number of said each data cluster is used to indicate an order of the current data cluster in an aggregation layer to which the current data cluster belongs; and
separately storing the index sequence number of each data cluster.

9. The method according to claim 1, wherein the aggregation interval comprises an aggregation time interval or an aggregation count value interval.

10. The method according to claim 1, further comprising:
setting a data channel, wherein the data channel comprises an aggregation start mark, a capacity of the data channel, and a list of aggregation layers comprised in the data channel.

11. A computing device, wherein the computing device comprises a processor and a memory, and the processor is configured to execute a program instruction in the memory to implement operations comprising:
obtaining at least one piece of data, wherein each said at least one piece of data comprises at least two attributes;
separately performing aggregation calculation, based on M aggregation intervals, on an attribute value of a first target attribute of the at least one piece of data to obtain T data clusters, wherein the M aggregation intervals are different from each other and are intervals of a second target attribute of the at least two attributes, each data cluster of the T data clusters comprises an aggregate value, the aggregate value of said each data cluster is obtained by performing aggregation calculation on attribute values of the first target attribute of pieces of data having attribute values of the second target attribute belonging to a data range corresponding to the data cluster, a span of the data range being equal to a respective one of the M aggregation intervals, M is an integer greater than or equal to 2, and T≥M, wherein each aggregation layer of M aggregation layers corresponds to one aggregation interval of the M aggregation intervals, any two adjacent aggregation intervals of the M aggregation intervals have a parent-child relationship in which a parent aggregation interval of said any two aggregation intervals is an integer multiple of a child aggregation interval of said any two aggregation intervals;

storing the T data clusters in a database in the memory, wherein each data cluster of the T data clusters is stored in the database in a respective data structure that comprises the aggregate value of the each data cluster and that is associated in the database with a data structure of a corresponding one of the M aggregation layers;

receiving a query request, wherein the query request comprises a query range;

obtaining from the database, through query, at least two data clusters from the M aggregation layers based on the query range, wherein the obtained at least two data clusters belong to different aggregation layers, a data range of each data cluster of the obtained at least two data clusters intersects with the query range, and a union set of the data ranges of all the obtained at least two data clusters is the same as the query range; and performing aggregation calculation on aggregate values comprised in the obtained at least two data clusters, to obtain a query result.

12. The computing device according to claim 11, wherein the processor is configured to execute a program instruction in the memory to further implement operations comprising:
before said separately performing aggregation calculation, presetting M aggregation layers.

13. The computing device according to claim 11, wherein the processor is configured to execute a program instruction in the memory to implement operations comprising:
obtaining, based on the query range and by performing matching layer by layer in descending order starting from a first aggregation layer, a data cluster that matches the query range in each aggregation layer of the M aggregation layers, wherein the first aggregation layer is an aggregation layer with a largest aggregation interval.

14. The computing device according to claim 12, wherein each aggregation layer comprises an aggregation algorithm.

15. The computing device according to claim 11, wherein the aggregation interval comprises an aggregation time interval or an aggregation count value interval.

16. A non-transitory computer readable storage medium, wherein the non-volatile computer readable storage medium comprises a computer instruction which, when executed by a processor of a computing device, causes the computing device to perform operations comprising:
obtaining at least one piece of data, wherein each said at least one piece of data comprises at least two attributes;
separately performing aggregation calculation, based on M aggregation intervals, on an attribute value of a first target attribute of the at least one piece of data to obtain T data clusters, wherein the M aggregation intervals are different from each other and are intervals of a second target attribute of the at least two attributes, each data cluster of the T data clusters comprises an aggregate value, the aggregate value of said each data cluster is obtained by performing aggregation calculation on attribute values of the first target attribute of pieces of data having attribute values of the second target attribute belonging to a data range corresponding to the data cluster, a span of the data range being equal to a respective one of the M aggregation intervals, M is an integer greater than or equal to 2, and T≥M, wherein each aggregation layer of M aggregation layers corresponds to one aggregation interval of the M aggregation intervals, any two adjacent aggregation intervals of the M aggregation intervals have a parent-child relationship in which a parent aggregation interval of said any two aggregation intervals is an integer multiple of a child aggregation interval of said any two aggregation intervals;

storing the T data clusters in a database in a memory, wherein each data cluster of the T data clusters is stored in the database in a respective data structure that comprises the aggregate value of the each data cluster and that is associated in the database with a data structure of a corresponding one of the M aggregation layers;

receiving a query request, wherein the query request comprises a query range;

obtaining from the database, through query, at least two data clusters from the M aggregation layers based on the query range, wherein the obtained at least two data clusters belong to different aggregation layers, a data range of each data cluster of the obtained at least two data clusters intersects with the query range, and a union set of the data ranges of all the obtained at least two data clusters is the same as the query range; and performing aggregation calculation on aggregate values comprised in the obtained at least two data clusters, to obtain a query result.

17. The non-transitory computer readable storage medium according to claim 16, wherein the operations further comprise:

before said separately performing aggregation calculation, presetting M aggregation layers.

\* \* \* \* \*